(12) United States Patent
Drozdov et al.

(10) Patent No.: US 11,947,717 B2
(45) Date of Patent: Apr. 2, 2024

(54) GAZE ESTIMATION SYSTEMS AND METHODS USING RELATIVE POINTS OF REGARD

(71) Applicant: BLINK TECHNOLOGIES INC., Palo Alto, CA (US)

(72) Inventors: Gilad Drozdov, Haifa (IL); Oren Haimovitch Yogev, Los Altos, CA (US); Igor Nor, Haifa (IL)

(73) Assignee: BLINK TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 17/582,016

(22) Filed: Jan. 24, 2022

(65) Prior Publication Data
US 2022/0236797 A1 Jul. 28, 2022

Related U.S. Application Data

(60) Provisional application No. 63/140,258, filed on Jan. 22, 2021.

(51) Int. Cl.
*G06F 3/01* (2006.01)
*G06N 3/045* (2023.01)
(Continued)

(52) U.S. Cl.
CPC .............. *G06F 3/013* (2013.01); *G06F 3/012* (2013.01); *G06N 3/084* (2013.01); *G06T 7/74* (2017.01); *G06V 10/25* (2022.01); *G06N 3/045* (2023.01)

(58) Field of Classification Search
CPC ......... G06F 3/013; G06F 3/012; G06N 3/084; G06N 3/045; G06N 3/048; G06T 7/74;
(Continued)

(56) References Cited

U.S. PATENT DOCUMENTS 5,731,805 A * 3/1998 Tognazzini ........... G06F 3/0485
382/117
6,323,884 B1 * 11/2001 Bird ..................... G06F 3/04812
715/810
(Continued)

OTHER PUBLICATIONS

NPL; IEEE Xplore, "Real-time monocular 6-DOF head pose estimation from salient 2D points", Dated: Sep. 17-20, 2017, 3 pages.
(Continued)

*Primary Examiner* — Mihir K Rayan
(74) *Attorney, Agent, or Firm* — AlphaPatent Associates Ltd.; Daniel J. Swirsky

(57) ABSTRACT

Embodiments described systems and method to estimate user gaze comprising receiving a target image data associated with the user from a camera coupled with the display, wherein the target image data includes a target eye patch image data associated with the user; and determining, using a neural network, the target point of regard associated with the target image data based on: the target eye patch image data, a plurality of aggregated gaze reference vectors, and a plurality of reference image data associated with the user, respectively associated with the plurality of aggregated gaze reference vectors. In embodiments, the target point of regard is determined within a predetermined threshold. In embodiments, the target point of regard is mapped onto the display.

19 Claims, 14 Drawing Sheets

(51) Int. Cl.
  *G06N 3/084* (2023.01)
  *G06T 7/73* (2017.01)
  *G06V 10/25* (2022.01)

(58) Field of Classification Search
  CPC . G06T 2207/10016; G06T 2207/20081; G06T 2207/20084; G06T 2207/30196; G06V 10/25; G06V 10/82; G06V 40/161; G06V 40/18
  See application file for complete search history.

(56) References Cited

U.S. PATENT DOCUMENTS

| | | | | |
|---|---|---|---|---|
| 9,563,805 | B2* | 2/2017 | Cheung | A61B 3/113 |
| 9,811,157 | B2* | 11/2017 | Rijnders | G06V 40/193 |
| 11,513,593 | B2* | 11/2022 | Drozdov | G06T 1/20 |
| 2012/0019645 | A1* | 1/2012 | Maltz | G02B 27/017 |
| | | | | 348/78 |
| 2013/0113786 | A1* | 5/2013 | King | H04N 13/31 |
| | | | | 345/419 |
| 2016/0063303 | A1* | 3/2016 | Cheung | G06V 40/193 |
| | | | | 382/103 |
| 2019/0266701 | A1* | 8/2019 | Isikdogan | G06T 7/73 |
| 2021/0085258 | A1* | 3/2021 | Jayachandra | G06V 10/50 |
| 2022/0222969 | A1* | 7/2022 | Lu | G06T 7/73 |

OTHER PUBLICATIONS

NPL titled Losses explained: Contrastive Loss, by "Maksym Bekuzarov", published on Apr. 19, 2020, 12 pages.
NPL titled; How is a spatial features extraction done, from Quora; 5 pages.
NPL titled; How Convolutional Layers Work in Deep Learning Neural Networks, by Hong Jing (Jingles), retrieved on Jan. 24, 2022, 11 pages.
NPL titled Deep Learning Fundamentals, "Convolutional Layers vs Fully Connected Layers, by Diego Unzueta", published on Nov. 13, 2021, 11 pages.
NPL titled MathWorks, "Train Convolutional Neural Network for Regression", retrieved on Jan. 24, 2022, 7 pages.
IEEE Xplore, "HOS image similarity measure for human face recognition", date of Conference: Dec. 13-16, 2017, 3 Pages.

* cited by examiner

GAZE ESTIMATION SYSTEMS AND METHODS USING RELATIVE POINTS OF REGARD

CROSS-REFERENCE TO RELATED APPLICATION

This application claims priority to U.S. Provisional Patent Application No. 63/140,258 filed Jan. 22, 2021, which is hereby incorporated by reference in its entirety.

FIELD

Embodiments herein include gaze estimation systems and methods using relative points of regard.

SUMMARY

Embodiments of the present disclosure may include a method to estimate a target point of regard associated with a user of a display. In an embodiment, the method may include receiving a target image data associated with the user from a camera coupled with the display. In an embodiment, the target image data may include a target eye patch image data associated with the user. Embodiments may also include determining, using a neural network, the target point of regard associated with the target image data based on the target eye patch image data.

Embodiments may also include a plurality of aggregated gaze reference vectors respectively associated with a plurality of reference image data associated with the user. In some embodiments, the target point of regard may be determined within a predetermined threshold. Embodiments may also include mapping the target point of regard onto the display.

In some embodiments, the method may include associating a weighting factor with one or more reference image data of the plurality of reference image data based on a probability of a match between the target eye patch image data and the one or more reference image data. Embodiments may also include using the weighting factor associated with the one or more reference image data to determine the target point of regard within the predetermined threshold.

In some embodiments, the method may include updating the neural network with the target point of regard, and the associated target image data. In some embodiments, the method may include calculating a contrastive gaze loss function to determine a gaze error associated with the target point of regard. In some embodiments, the method may include updating the weighting factors using a back-propagation calculation. In some embodiments, the back-propagation calculation includes one or more of a stochastic gradient descent algorithm and an adaptive moment estimation algorithm.

In some embodiments, the camera may be configured to be a minimum distance of 30 cm to 300 cm from the user, in a field of view from the camera.

In some embodiments, the target image data includes target head region image data. In some embodiments, one or more of the plurality of reference image data each includes reference head region image data. The method may include determining a target six-dimensional (6D) head position associated with the target head region image data. Embodiments may also include determining a reference 6D head position associated with the reference head region image data. Embodiments may also include determining a target 3D eye position associated with the target eye patch image data.

In some embodiments, the target point of regard may be mapped onto the display. In some embodiments, the mapping may be to one of rendered content on the display, 2D coordinates associated with the display, 3D coordinates associated with the display, and pixels associated with the display. In some embodiments, the method further includes selecting a region of interest via an eye gesture associated with the user. Embodiments may also include converting the selected region of interest and the associated eye gesture to computer-readable data to execute a command in an operating system associated with the display.

Embodiments may also include dimensions associated with the target point of regard that comprise a single point. Embodiments of dimensions may also include one or more of the following: text, a single pixel, a cursor position, a 3D graphical rendering, a 2D graphical rendering, a range of text, a word, a 2D area, and a 3D area.

Embodiments may also include dimensions associated with the target point of regard that exceed spatial dimensions of the display. In some embodiments, the target point of regard refers to a particular moment in time, for rendered content that may change over time. In some embodiments, the rendered content includes one or more of text content and image content displayed within the display. In some embodiments, the target point of regard may be determined based on one or more of the following: rendered content for the display, content focus, and content selection.

In some embodiments, the method further includes receiving the content focus and the content selection through an input module for an operating system. In some embodiments, the content focus and the content selection may be associated with one or more eye gestures at the target point of regard. In some embodiments, the method further includes determining a first blink associated with the target eye patch image data of the user, and a second blink associated with the target eye patch image data of the user. Embodiments may also include determining a time difference between one or more of the following a beginning of the first blink and a beginning of the second blink, an end time of the first blink and an end time of the second blink, and a first time during the first blink and a first time during the second blink. Embodiments may also include determining a blink rate using the time difference.

In some embodiments, the method further includes determining a probability of a blink during an image capture, based on the blink rate. In some embodiments, the plurality of aggregated gaze reference vectors associated with the plurality of reference image data, respectively, may be determined using one or more of the following: a first head image data having a first eye position and a first head position in response to rendered content displayed in the display at a reference point of regard in the display.

Embodiments may also include weighted reference image data. Embodiments may also include a first gaze reference vector associated with first head image data. Embodiments may also include updating the plurality of aggregated gaze reference vectors with the first gaze reference vector.

Embodiments may also include updating the plurality of aggregated gaze reference vectors with the target point of regard associated with the target image data. Embodiments may also include receiving a first head image data having a first eye position and a first head position, a second head image data having a second eye position and a second head position, and a third head image data having a third eye position and a third head position. Embodiments may also include determining an estimated gaze vector associated with the third eye position based on the first head image data and the second head image data.

In some embodiments, the method further includes using the neural network to estimate a future point of regard on a 3D display. In some embodiments, the method further includes receiving the target eye patch image data associated with the user to determine one or more of eye characteristics, eye position, and gaze position. Embodiments may also include receiving an infrared light source through a camera lens in a frequency range of about 4000 cm-1 to about 12,500 cm-1. Embodiments may also include receiving a visible light source through the camera lens in a frequency range of about 12,500 cm-1 to about 26,300 cm-1.

Embodiments of the present disclosure may also include a system including an image processor to process image data and control image capture. Embodiments may also include a camera coupled with the image processor and configured to capture the user image data. In some embodiments, a field of view associated with the camera includes a region having a distance at least 30 cm from the camera. In some embodiments, the camera includes a lens with an aperture through which light travels to capture the user image data.

In some embodiments, the image processor may be configured to determine, from the user image data, target head region image data and target eye patch image data. Embodiments may also include using a neural network to determine the target point of regard associated with the user image data, using on the target eye patch image data. In some embodiments, the target point of regard may be determined within a predetermined threshold.

In some embodiments, the system further includes a display having an eye panel controller. In some embodiments, the target point of regard may be mapped to coordinates associated with the eye panel controller. In some embodiments, the mapped coordinates may be associated with one of 2D coordinates of the eye panel controller or 3D coordinates of the eye panel controller.

In some embodiments, the mapped coordinates may be associated with gaze fixation coordinates determined in pixels on the eye panel controller. In some embodiments, the system further includes selecting the region of interest via eye gestures. Embodiments may also include converting the selected region of interest and the eye gestures to computer-readable data to execute a command in an operating system associated with the eye panel controller. In some embodiments, the eye gestures may be associated with one or more input modules for the operating system. In some embodiments, the target point of regard may be associated with the gaze fixation coordinates including rendered content in the eye panel controller. In an embodiment, the target point of regard is the estimated gaze destination associated with the user. In some embodiments, the rendered content includes one or more of text content and image content displayed on the eye panel controller.

Embodiments may also include dimensions associated with the target point of regard exceed spatial dimensions of the eye panel controller. In some embodiments, the target point of regard may be associated with a particular moment in time for rendered content configured to change over time. In some embodiments, the rendered content includes one or more of text content and image content displayed within the eye panel controller.

In some embodiments, the image processor may be further configured to estimate a future point of regard, associated with the user, on the eye panel controller. In some embodiments, the eye panel controller may include a digital display that projects 3D content accessible by the user and may be configured to be selected using one or more eye gestures. In some embodiments, the one or more eye gestures include one or more of the following: a fixation in a dwell-time, blinks, blinks at different time intervals, blinks at different lengths of time, winks, winks at different time intervals, and winks at different lengths of time.

In some embodiments, the target head region image data may be used to determine a 6D head position, and the target eye patch image data may be used to determine a 3D eye position. In some embodiments, the 6D head position may include a head position and a head orientation. In some embodiments, the head position includes a determination of six degrees of freedom. In some embodiments, the six degrees of freedom includes the head position using three degrees of freedom of spatial location, and the head orientation including roll, pitch and yaw.

In some embodiments, the camera may be further configured to determine one or more facial landmarks associated with the user image data. In some embodiments, the system further includes an expression module configured to determine one or more facial expressions using the one or more facial landmarks. In some embodiments, the target eye patch image data includes a left target eye patch image data and a right target eye patch image data.

In some embodiments, the target eye patch image data includes two visible eyes in a frame at a predetermined resolution threshold. In some embodiments, the target eye patch image data excludes an image frame where a blink may be detected. In some embodiments, the target eye patch image data excludes an image frame outside a range of the resolution of (96×48, 192×96, 384×192). In some embodiments, the system further includes a weighting module configured to apply a weighting value to one or more of the target eye patch image data, to one or more of the plurality of aggregated gaze reference vectors, and to one or more of the plurality of reference image data, respectively associated with the plurality of aggregated gaze reference vectors.

In some embodiments, the system further includes a machine-learning module associated with the neural network. In some embodiments, the weighting value may be used to update the neural network. In some embodiments, the machine-learning module may be configured to iteratively determine the plurality of aggregated gaze reference vectors respectively associated with the plurality of reference image data. Embodiments may also include determining the weighting values associated with the one or more of the plurality of aggregated gaze reference vectors. Embodiments may also include selecting the target point of regard at a point on an eye panel controller using the weighting values associated with the one or more of the plurality of aggregated gaze reference vectors.

In an embodiment, a non-transitory computer readable medium comprising instructions which, when executed by one or more hardware processors, causes performance of operations. In embodiments, the performance of operations comprises receiving a target image data associated with the user from a camera coupled with the display, wherein the target image data includes a target eye patch image data associated with the user; determining, using a neural network, the target point of regard associated with the target image data based on: the target eye patch image data, a plurality of aggregated gaze reference vectors, and a plurality of reference image data associated with the user, the plurality of reference image data respectively associated with the plurality of aggregated gaze reference vectors. In embodiments, the target point of regard is determined within a predetermined threshold. In embodiments, the target point of regard is mapped onto the display.

In some embodiments, the non-transitory computer readable medium executes operations including associating a weighting factor with one or more reference image data of the plurality of reference image data based on a probability of a match between the target eye patch image data and the one or more reference image data, and using the weighting factor of the one or more reference image data to determine the target point of regard within the predetermined threshold.

In some embodiments, the non-transitory computer readable medium executes operations including updating the neural network with the target point of regard, and the associated target image data. In some embodiments, the non-transitory computer readable medium executes operations including calculating a contrastive gaze loss function to determine a gaze error associated with the target point of regard. In some embodiments, the non-transitory computer readable medium executes operations including updating the weighting factors using a back-propagation calculation, wherein the back-propagation calculation includes one or more of a stochastic gradient descent algorithm and an adaptive moment estimation algorithm.

In some embodiments, the camera is configured to be a minimum distance of 30 cm to 300 cm from the user. In some embodiments, the plurality of aggregated gaze reference vectors is determined using one or more of the following: (a) receiving a first head image data having a first eye position and a first head position in response to rendered content displayed in the display at a reference point of regard in the display, using: (1) the first eye position, (2) the first head position, (3) the reference point of regard in the display, and (4) weighted reference image data, to determine a first gaze reference vector associated with first head image data, and updating the plurality of aggregated gaze reference vectors with the first gaze reference vector, (b) updating the plurality of aggregated gaze reference vectors with the target point of regard associated with the target image data, and (c) receiving a first head image data having a first eye position and a first head position, a second head image data having a second eye position and a second head position, and a third head image data having a third eye position and a third head position, and determining an estimated gaze vector associated with the third eye position based on the first head image data and the second head image data.

In some embodiments, the non-transitory computer readable medium executes operations including determining, using a neural network, a target point of regard associated with the user image data based on: the target eye patch image data, a plurality of aggregated gaze reference vectors, and a plurality of reference image data respectively associated with the plurality of aggregated gaze reference vectors. In embodiments, the target point of regard is determined within a predetermined threshold.

In some embodiments, the non-transitory computer readable medium executes operations including iteratively determining the plurality of aggregated gaze reference vectors respectively associated with the plurality of reference image data; determining the weighting values associated with the one or more of the plurality of aggregated gaze reference vectors; and selecting the target point of regard at a point on an eye panel controller using the weighting values associated with the one or more of the plurality of aggregated gaze reference vectors.

In some embodiments, the non-transitory computer readable medium executes operations including mapping the target point of regard to coordinates of pixels associated with an eye panel controller of the display. In some embodiments, the non-transitory computer readable medium executes operations including selecting the region of interest via eye gestures, and converting the selected region of interest and the eye gestures to computer-readable data to execute a command in an operating system associated with the eye panel controller.

BRIEF DESCRIPTION OF THE DRAWINGS

Various aspects of the processes and apparatuses will now be presented in the detailed description by way of example, and not by way of limitation, with the reference to the accompanying drawings, wherein.

DETAILED DESCRIPTION

Figure 1:
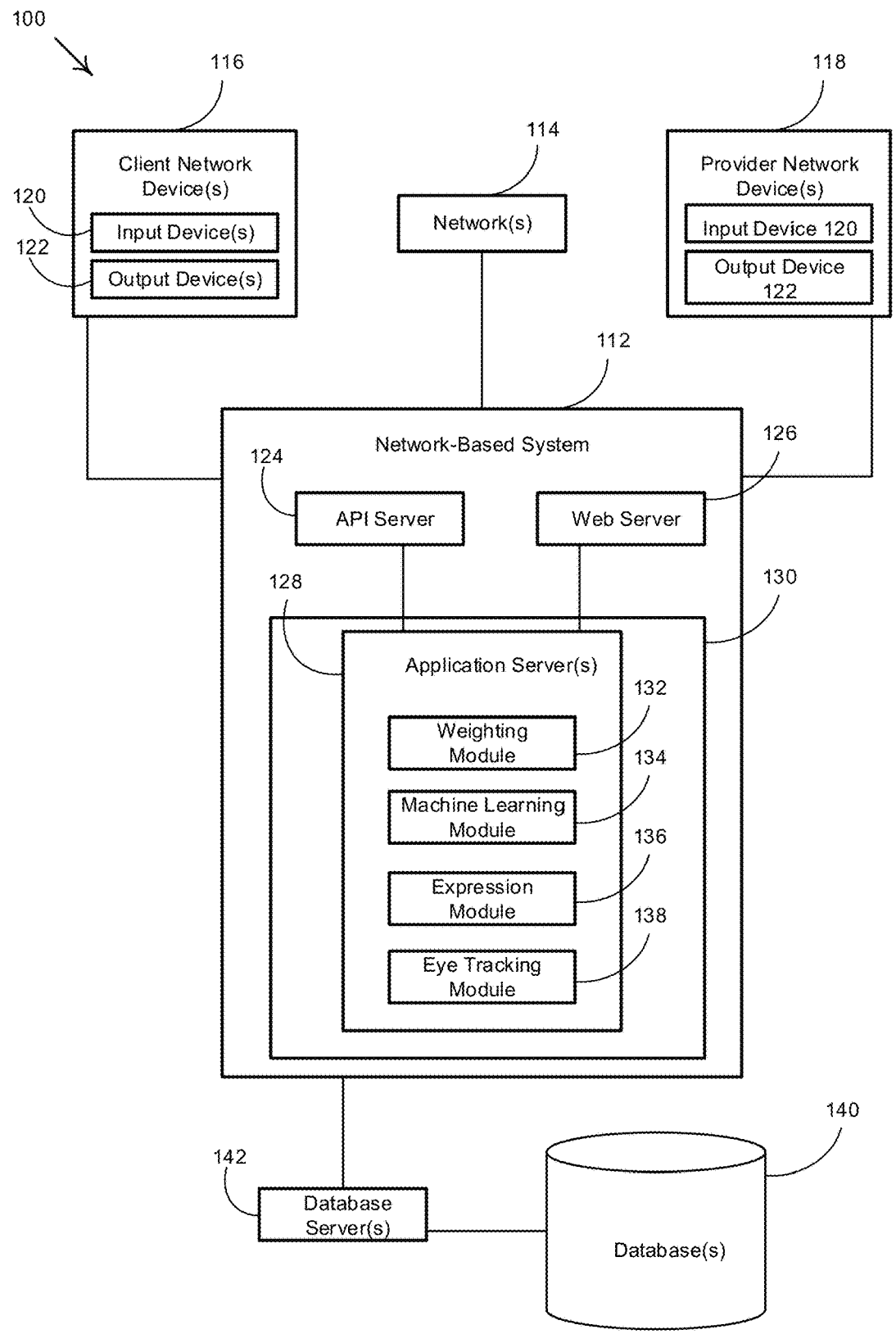
FIG. 1 illustrates a network diagram depicting a gaze estimation system, according to an example embodiment.

In embodiments described herein, a user gaze towards a display is estimated. In embodiments, the user is positioned towards one or more digital cameras associated with the display. The digital camera may include one or more image sensors, and one or more image processors associated with the one or more image sensors.

In embodiments described herein, the user gaze is estimated using a training process and machine learning as described herein. In embodiments, the training process may include aggregation of weighted reference images associated with the user along with the weighted gaze reference vectors respectively associated with the weighted reference images (e.g., reference pairs).

The disclosure relates to systems, methods, and programs for implicitly determining the user's point-of-regard (PoR), and its relative location based on aggregation of reference points of regard associated with the user, e.g., aggregated reference points of regard. The aggregated reference points of regard may be determined through an end-to-end learning methodology scheme. In embodiments, the aggregated reference points of regard may be determined by combining, summing, or aggregating each reference pair into a single module. This aggregation may overcome inherent differences between individuals' two eyes through this relative training process associated with the neural network, including identifying spatial and salient features related to the specific user. In embodiments, the plurality of reference image data includes the plurality of relative image data. In embodiments, the plurality of aggregated gaze reference vectors includes the plurality of aggregated gaze relative vectors.

In embodiments, training of a new user may begin with a raw gaze prediction associated with another user with associated image data. In embodiments, the raw gaze prediction is used when there is no available relative (e.g. reference) points associated the new user.

The raw gaze prediction uses an initial estimate of a relative point of regard based on a screen saliency map having objects on the display, where a probability of a point of regard associated with a new user gaze may be determined. In embodiments, the system is trained for a target image for which a target point of regard is estimated. In embodiments, the system is further trained with a reference image with known ground truth. In embodiments, during an inference phase, the training may be selected from two embodiments: implicit and explicit. In the implicit embodiment, the first image is captured, without a ground truth on the screen, as a reference and for estimating a single raw prediction based on the particular image itself, as the relative point of regard is estimated and taken from a ground-truth position of the display. In embodiments, the implicit mode is less optimal as an anchor point is estimated from a different user and may be less accurate at estimating new target points of regard. In the explicit embodiment, a user is shown a point or region at a ground truth 2D location on the display to attract the user's eye gaze. As described herein, the camera captures the user head image, wherein the user head image is used as the reference image associated with the ground truth 2D location in a first relative pair.

In an embodiment, the machine-learning module may include a differential gaze analyzer. In embodiments, the machine-learning module may be agnostic as to how the reference point of regard may be obtained. In embodiments, the reference point of regard may be obtained without using a calibration method as described in example embodiments herein. In embodiments, a training associated with a new user may begin by using reference images of other users and associated gaze reference vectors of the reference images. In embodiments, training from a plurality of users is used to train the neural network of the new user. In embodiments, the system determines one or more user-associated image and associated gaze reference vectors to begin training of the neural network of the new user. The new user may or may not have similar facial landmarks and relative spacing between the facial landmarks. The new user may have a similar age or uses a similar network device as the user used in the trained neural network.

In embodiments, methods herein determine a similarity-matrix between a new user image and reference images. See, for example, the image similarity measure for human face recognition in the following article incorporated herein: https://ieeexplore.ieee.org/document/8322814. In embodiments, an existing user or set of users with predetermined characteristics and features in the database is used to train the network of the new user.

In embodiments, the training does not include calibration, such as explicit calibration, for the trained neural network. In embodiments, the training includes 9/25 points.

Figure 8:
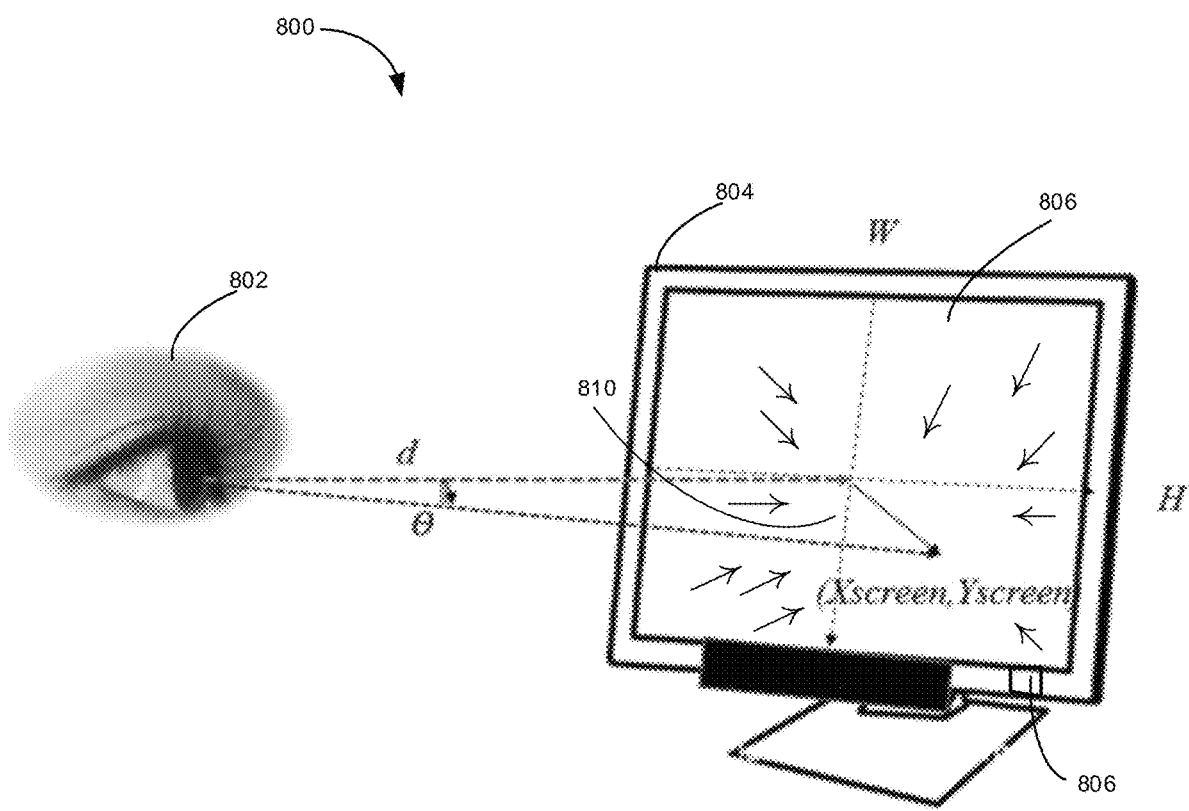
FIG. 8 is a diagram illustrating a user eye gaze at a target point of regard on a display, according to some embodiments of the present disclosure.

In embodiments, the target point of regard is represented as coordinates on the display (Xscreen, Yscreen), as shown in FIG. 8. In embodiments, the target point of regard is represented as relative to the user associated with the user gaze. The target point of regard may be represented as an angle from the user to be mapped on the display as shown in FIG. 8 as distance d from the user and at angle theta to the target point of regard.

In embodiments, the relative points of regard may include up to an infinite relative points of regard for a particular user, depending on the resolution as described herein. The relative points of regard associated with a particular user may begin at zero points of regard and then be generated as described in multiple embodiments herein. In embodiments, training methods and systems described may use a predetermined number of relative points of target adjusted according to a size of the display and the resolution of the display.

In embodiments, training systems and methods may be scaled to a large number of pairs of relative points of regard with the relative user image. In embodiments, the scaling of the trained system may be used with continuous cameras and may be used with multiple cameras. In embodiments, the target point of regard may be determined based on the image input including the relative location of the user based on a sequence of prior images of the user (or a similar user). In an embodiment, a camera may be set up at a different location relative to the user than the camera that was used to determine the relative gaze vectors of the user. In an embodiment, a camera may capture an image of the user at different time sequences than was used to determine the relative gaze vectors of the user.

In embodiments, a Siamese network is not used for the neural network. In embodiments, eye gestures are not used to select regions of interest on the display. In embodiments, a head pose is not used to train the neural network. In embodiments, the training system and method does not determine the target point of regard as coordinates on a display. In embodiments, the training system and method does not determine the target point of regard relative to the user.

In embodiments, the target point of regard is the result of output of the convolutional neural network. In embodiments, a Gaussian Average Calculation may not be used to calculate a result of the neural network. In embodiments, the result does not include a Gaussian Average with an associated parameter that is predetermined by the system using a Gaussian kernel bandwidth a. In embodiments, an output of the neural network is a known function.

In an embodiment, machine-learning module associated with the training described herein may determine an estimated gaze vector associated with an image of the user. The estimated gaze vector may include the target point of regard for the user.

In embodiments, the system includes inputs into training from multiple references associated with the particular user. In embodiments, this system includes at least one reference point of regard to be used for the target point of regard estimation. In embodiments, the target point of regard estimation may be used in a gaze prediction method scaled to a much larger number of reference points of regard than described herein. In embodiments, the system may be used to scale to use with multiple cameras, including long-range gaze estimation with billboards, for example.

FIG. 1 illustrates a network diagram depicting a gaze estimation system 100, according to an example embodiment. The embodiment of FIG. 1 illustrates the system 100 having a client-server architecture, according to an example embodiment. A system, in the example form of a network-based system 112, provides server-side functionality, via a network 114 (e.g., the Internet, a public or private telephone network (wireline or wireless), a private wireless network using technologies such as Bluetooth or IEEE 802.11x or other networks) to one or more network blocks. In a client-server architecture, FIG. 1 illustrates, for example, a network block being a web client (e.g., a browser, such as the INTERNET EXPLORER® browser developed by MICROSOFT®) executing on client machine, e.g. on a client network-based device 116. A device application or a programmatic client may also execute on the client machine. Embodiments are of course not limited to a client-server architecture, and could also find applications in a distributed, or peer-to-peer, architecture system.

The network blocks, including client network-based device(s) 116 and provider network-based device(s) 118, may include a digital camera, a mobile device, a palmtop computer, a laptop computer, a desktop computer, a personal digital assistant, a cellular telephone, a communications device, a wireless telephone, a land-line telephone, a control system, a camera, a scanner, a television, television cable, a telephone with a web browser, a facsimile machine, a printer, a pager, and/or a personal trusted device. The devices 116, 118 may include a card, such as a smart card, a magnetic card, and/or a key card. The devices 116, 118 may include a telephone or any device capable of Short Messaging Service (SMS) messaging, multimedia messaging service (MMS) messaging and/or generating audio tones, such as dual-tone multi-frequency (DTMF) tones. The device may be browser-enabled. The device may engage in an interactive message and/or open communication session, such as SMS, electronic mail, xHTML, Wireless Application Protocol (WAP), web, interactive voice response (IVR) and/or other mobile interfaces. The communication session between a client machine and the network-based system may involve multiple technology modalities, e.g. the client user may engage the system via SMS and receive a responsive communication as an SMS with an embedded hyper-linked URL directing the client user's device to a WAP or web page. A hyperlinked URL may be delivered directly to the device from an application server(s) and may be used to access a web site or a microbrowser, such as a WAP site. The device 116, 118 may enable mobile videophone communications, digital television signals, and/or digital radio signals. The device may include a receiver to receive near field communications.

In an embodiment, the client network device 116 may include one or more of input devices 120 and output devices 122 as described in more detail herein. In a similar embodiment, the provider network device 118 may include the input devices 120 and output devices 122.

At least one of the devices 116, 118 may be associated with an account holder, e.g., a user. Turning specifically to the network-based system 112, an Application Program Interface (API) server 124, and a web server 126 may be coupled to, and may provide programmatic interfaces to one or more application servers 128. The devices may use one or more of these interfaces to access the application server(s) 128. For example, the web client may access the application server(s) 128 via the web interface supported by the web server 126. The web interface may include a web browser or any microbrowser, such as xHTML or WAP. Similarly, the programmatic client accesses the various services and functions provided by the application server(s) 128, via the programmatic interface provided by the API server 124 and/or the web server 126. In an additional embodiment, an application supported by one or more applications of the application server(s) may be downloadable to the network-based device. The device(s) may host the interface associated with the one or more applications of the application server(s) 128. The interface on the device may be an API interface, an SMS interface, a web interface, and/or an IVR interface. Consumer wireless device platforms, such as Java 2 Platform Micro Edition (J2ME), J2SE and J2EE allow developers to use Java and a wireless toolkit to create applications and programs for the device 118. The J2ME interface may include an application-programming interface (API) for the device. The application of the programmatic client may also access the Internet using, for example, Binary Runtime Environment for Wireless (BREW).

The application server(s) 128 may host one or more applications(s) 130. The applications 130 may include the following modules or generators: a weighting module 132, and a machine-learning module 134 according to embodiments described with respect to FIG. 1. The applications 130 may also include an expression module 136 associated with user gestures, such as user expressions described in more detail according to embodiments herein. The applications 130 may also include an eye-tracking module 138 described in more detail according to the embodiment of FIG. 2 herein.

In an embodiment, a non-transitory computer readable medium comprising instructions which, when executed by one or more hardware processors, causes performance of operations. In embodiments, the performance of operations comprises receiving a target image data associated with the user from a camera coupled with the display, wherein the target image data includes a target eye patch image data associated with the user; determining, using a neural network, the target point of regard associated with the target image data based on: the target eye patch image data, a plurality of aggregated gaze reference vectors, and a plurality of reference image data associated with the user, the plurality of reference image data respectively associated with the plurality of aggregated gaze reference vectors. In embodiments, the target point of regard is determined within a predetermined threshold. In embodiments, the target point of regard is mapped onto the display.

In some embodiments, the non-transitory computer readable medium executes operations including associating a weighting factor associated with the weighting module 132 with one or more reference image data of the plurality of reference image data based on a probability of a match between the target eye patch image data and the one or more reference image data, and using the weighting factor of the one or more reference image data to determine the target point of regard within the predetermined threshold.

In some embodiments, the non-transitory computer readable medium executes operations including updating the neural network with the target point of regard, and the associated target image data. In some embodiments, the non-transitory computer readable medium executes operations including calculating a contrastive gaze loss function to determine a gaze error associated with the target point of regard. In some embodiments, the non-transitory computer readable medium executes operations including updating the weighting factors using a back-propagation calculation, wherein the back-propagation calculation includes one or more of a stochastic gradient descent algorithm and an adaptive moment estimation algorithm.

In some embodiments, the camera is configured to be a minimum distance of 30 cm to 300 cm from the user. In some embodiments, the plurality of aggregated gaze reference vectors is determined using one or more of the following: (a) receiving a first head image data having a first eye position and a first head position in response to rendered content displayed in the display at a reference point of regard in the display, using: (1) the first eye position, (2) the first head position, (3) the reference point of regard in the display, and (4) weighted reference image data, to determine a first gaze reference vector associated with first head image data, and updating the plurality of aggregated gaze reference vectors with the first gaze reference vector, (b) updating the plurality of aggregated gaze reference vectors with the target point of regard associated with the target image data, and (c) receiving a first head image data having a first eye position and a first head position, a second head image data having a second eye position and a second head position, and a third head image data having a third eye position and a third head position, and determining an estimated gaze vector associated with the third eye position based on the first head image data and the second head image data.

In some embodiments, the non-transitory computer readable medium executes operations including determining, using a neural network, a target point of regard associated with the user image data based on: the target eye patch image data, a plurality of aggregated gaze reference vectors, and a plurality of reference image data respectively associated with the plurality of aggregated gaze reference vectors. In embodiments, the target point of regard is determined within a predetermined threshold.

In some embodiments, the non-transitory computer readable medium executes operations including iteratively determining the plurality of aggregated gaze reference vectors respectively associated with the plurality of reference image data; determining the weighting values associated with the one or more of the plurality of aggregated gaze reference vectors; and selecting the target point of regard at a point on an eye panel controller using the weighting values associated with the one or more of the plurality of aggregated gaze reference vectors.

In some embodiments, the non-transitory computer readable medium executes operations including mapping the target point of regard to coordinates of pixels associated with an eye panel controller of the display. In some embodiments, the non-transitory computer readable medium executes operations including selecting the region of interest via eye gestures, and converting the selected region of interest and the eye gestures to computer-readable data to execute a command in an operating system associated with the eye panel controller.

In some embodiments, the non-transitory computer readable medium executes operations including receiving the target eye patch image data associated with the user to determine one or more of eye characteristics, eye position, and gaze position. In some embodiments, receiving includes: an infrared light source through a camera lens in a frequency range of about 4000 cm-1 to about 12,500 cm-1 and a visible light source through the camera lens in a frequency range of about 12,500 cm-1 to about 26,300 cm-1. In an embodiment, the target eye patch image data is determined based on a received light have a wavelength in a range of about 380 nm to about 1500 nm through the camera lens.

The application server(s) may have access to a database 140 through, for example, the database server(s) 142. The database 140 may include user-specific information as described in more detail herein.

In embodiments, the network 114 may include a mobile telephone network, a wireless wide area network (WWAN), a wireline telephone network, a wireless local area network (wireless LAN or WLAN), a wireless Metropolitan Area Network (MAN), and/or a wireless personal area network (PAN)(e.g., a Bluetooth® network). Other network-based technologies that may be used to connect include PON, VSAT satellite, Micro-impulse Radar, Radio Frequency identification (RFID), UltraWide Band, and/or Infrared. The network-based device may connect to the web using mobile Internet exchange, e.g. Wireless Application Protocol (WAP) and/or Hypertext Transport Protocol (HTTP).

In other embodiments, the network 114 may include neural network. In an embodiment the neural network includes a Convolutional-Neural-Network (CNN). In an embodiment, the target point of regard may be determined based on a method of training using a Convolutional-Neural-Network (CNN). The CNN may aggregate the plurality of the reference points of regard and the target point of regard. In embodiments, the training network includes deep neural networks (DNNs), specifically convolutional-neural-networks (CNNs), in eye tracking and gaze estimation tasks as a form of eye appearance and/or feature-based method. In embodiments, an iterative training process uses reference points of regard. In embodiments, using the trained neural network, target points of regard for a user gazing at a digital display may be determined.

In embodiments, the machine-learning module may be used as part of a supervised differential analyzer training method. In embodiments, a first set of dimensions is used as part of the training input data to the neural network. In embodiments, a first set of dimensions is scaled to a specified size. For example, when there are fewer pixels than the specified size of the first set of dimensions, the point of regard is interpolated through interpolation calculation. In another example, when there are more pixels than the specified size of the first set of dimensions, the point of regard is decimated through applicable mathematical calculation.

In embodiments, the neural network includes a differential network. In embodiments, the differential network uses a single reference point, for example, a single point of regard. In embodiments, the differential network may be optimized with the addition of anchor points of regard collected from the user during the training, for example, the training phase. In embodiments, the differential network includes a relative network.

In embodiments, the neural network includes a deep-learning convolutional network. In embodiments, the neural network compares the current image data to one or more previously collected, e.g. aggregated, images in a form a feature reference vector. In embodiments, iteration is performed over a plurality of reference images as the current image data is processed to generate an iterative outcome associated with the target point of regard associated with the current image data.

For the left and right eye image reference pair, the convolutional-neural-network (CNN) may be trained using a range of from about 8 to 12 CNN micro-layers. Embodiments may use a sequence of 2D-convolution algorithm, a fully connected layer algorithm, a batch-normalization method, an exponential linear unit: $ELU(x)=\{x \text{ if } x>0 \text{ else } \alpha(\exp(x)-1)\}$ algorithm, and a dropout algorithm. In an embodiment, the 'parametric transform block' comprises the following: batch-normalization function, activation function (e.g. ReLu, Sigmoid, Tanh), and dropout layer algorithm. In an embodiment, a fully connected neural network includes a dense layer.

In an embodiment, regression is associated with the fully connected layers applied on the eye patch descriptor as explained in more detail herein. A point of regard regression is determined according to embodiments herein. In an embodiment, a relative regression is determined as a relative location from a reference point of regard. In embodiments, the relative regression includes a final output of the fully connected layers of the convolutional neural network as coordinates in the display in a target point of regard. See the following article as an example for training of a convolutional neural network https://www.mathworks.com/help/deeplearning/ug/train-a-convolutional-neural-network-for-regression.html, which is incorporated herein by reference.

In an embodiment, the first fully connected layer has the output vector to form an eye combination block, and the second fully connected layer on the reference head pose may form a reference head pose location vector. The eye combination block may be a linear operation and a function of embedding of one or both eyes.

Figure 7:
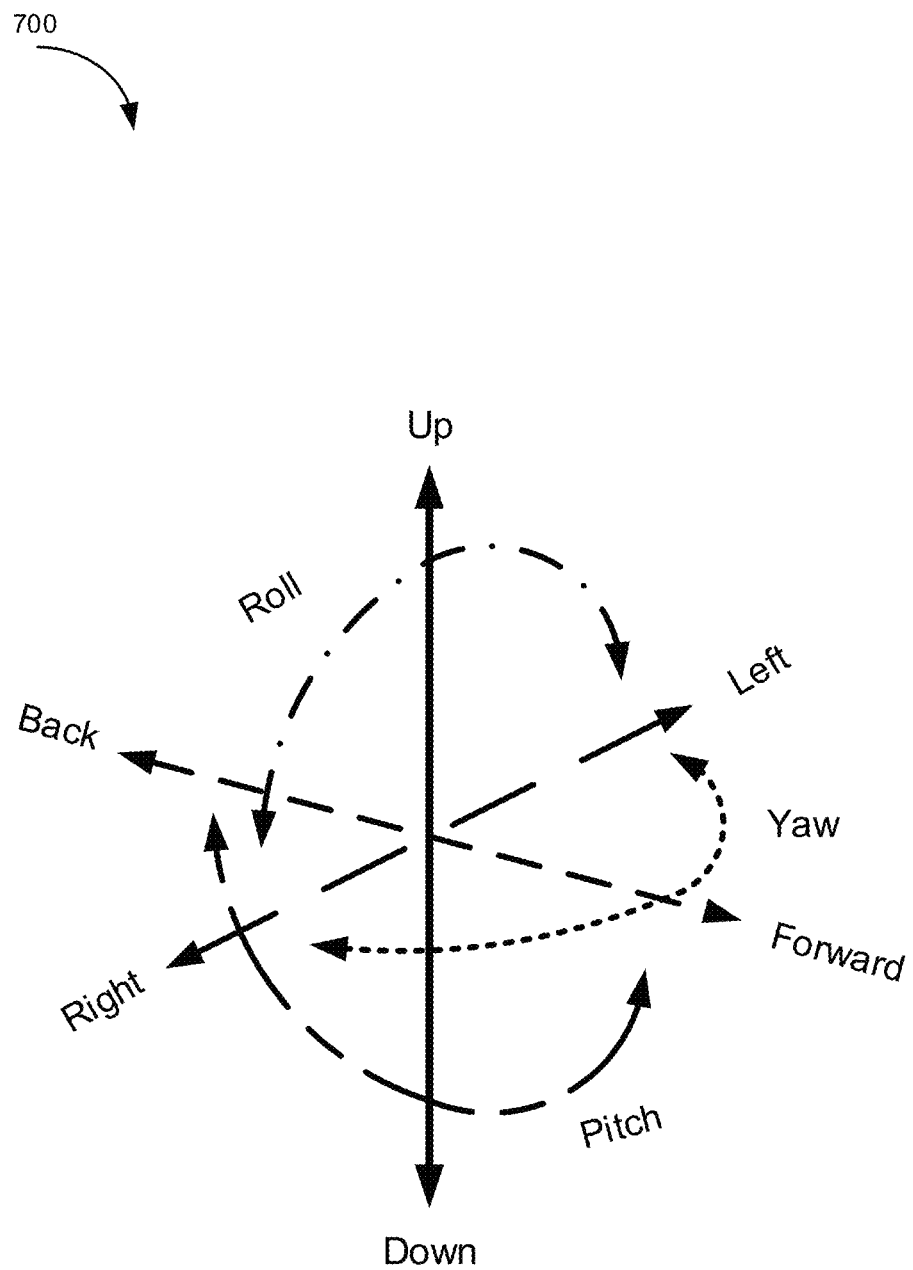
FIG. 7 is a diagram illustrating six degrees of freedom associated with a user head pose, according to some embodiments of the present disclosure.

In an embodiment, the head pose may be estimated in six degrees of freedom ("6D") as shown in FIG. 7. In embodiments, the location of a head pose associated with one or more of the first eye patch location and the second eye patch location may form a second head pose location vector as described herein. In an embodiment, vectors may be determined based on images of features of a user taken by the camera. The features or characteristics may include one of a head, a face, and an eye area, according to embodiments. Vectors may be determined based on reference eye patch locations, and on reference head poses, and on reference head locations in 6D according to embodiments herein.

In an embodiment, vectors may be aggregated. For example, feature vectors may be aggregated, features vectors and reference vectors may be aggregated, and reference vectors may be aggregated. In embodiments, aggregation may include a combining or combination of vectors. In an embodiment, aggregation may include forming an eye concatenation.

In some embodiments, the camera may be configured to be a minimum distance of 30 cm to 300 cm from the user. In some embodiments, the target image data may include target head region image data. In some embodiments, one or more of the plurality of reference image data each includes reference head region image data.

In an embodiment, a feature vector may be used to form a head pose concatenation. In an embodiment, a feature vector may be aggregated with a reference head pose location vector to form an output head pose combination block.

The system may also include the weighting module 132 configured to apply a weighting value to one or more of the target eye patch image data, to one or more of the plurality of aggregated gaze reference vectors, and to one or more of the plurality of reference image data, respectively associated with the plurality of aggregated gaze reference vectors.

In an embodiment, an error rate associated with one or both of the aggregation eye reference points of regard and the target point of regard. The error rate may be minimized by implementing a contrastive differential loss-function in an embodiment as described herein. The contrastive differential loss-function may include a contrastive relative loss-function in embodiments. In embodiments, an error is minimized from one or more aggregated eye reference points of regard during the training process. In embodiments, the reference points of regard are represented as x and y coordinates in centimeters on the display. In embodiments, the aggregated reference points of regard correspond to image data of the user in the reference pairs described herein.

In embodiments, the error minimized includes a Euclidian error calculation. In embodiments, the error calculation includes a gaze estimation, e.g., prediction, from the neural network using the reference points of regard. In embodiments, the aggregation is based upon the aggregation of the reference pairs.

In an embodiment, the contrastive gaze loss function is calculated. In an embodiment, the contrastive gaze loss function is calculated based upon a relative error of a target point of regard. In an embodiment, the contrastive gaze loss function may be calculated using mean-square-loss method or another relevant predetermined calculation method.

In an embodiment, the absolute loss function is calculated. In an embodiment, the absolute loss function is associated with the target point of regard and the aggregated reference pairs. In an embodiment, the aggregated reference pairs may be calculated using mean-square-loss method or another relevant predetermined calculation method.

In embodiments, the error is minimized based on implementation of the contrastive differential loss-function. In example embodiments, the contrastive differential loss-function includes the description and examples illustrated in https://medium_.con/@maksym.bekuzarov/losses-explained-contrastive-loss-f8f57fe32246#:~:text=Contrastive %20Loss %20is %20a %20metric %2Dlearning %20loss %20function %20introduced %20by, similar %E2%80%9D %20or %20% E2%88%9Cdissimilar%E2%80%9D, which is hereby incorporated by reference.

In embodiments, the error minimization is determined for the target point of regard, which may be determined in angles and centimeters as a relative position to the user, or in centimeters as coordinates of the display, as shown and described in more detail herein.

In some embodiments, the system further includes a weighting module configured to apply a weighting value to one or more of the target eye patch image data, to one or more of the plurality of aggregated gaze reference vectors, and to one or more of the plurality of reference image data, respectively associated with the plurality of aggregated gaze reference vectors. In embodiments, the weighting value is applied to image data. In embodiments, a set of operations, such as for example, multiplication, addition, and pooling, are applied by the neural network to the image data to determine the weighting value (e.g., factor) of the image data.

In particular embodiments, the operations are applied to the pixels of one or more of the reference images and the current input image for which the gaze is to be estimated as the target point of regard.

In embodiments, the weighting value is determined based on an error comparison (in centimeters, cm.), between calculated Point of regard and actual point of regard coordinates on the digital display using a "vanilla" CNN and the relative (e.g., trained) CNN, as a function of user ID, is illustrated, for an exemplary implementation described herein.

In an embodiment, weighting factors associated with the training of the neural network may be updated using, for example, back-propagation optimization. In an embodiment, the update may be calculated using one or more of an adaptive moment estimation algorithm, for example, an ADAM optimizer, and a stochastic gradient descent (SGD)

algorithm. In embodiments, averaging, regression, and gradients may be used in training and weighting for the neural network.

In the example embodiment of FIG. 1, a hardware-based system is configured to support machine learning using the machine-learning module 134. In some embodiments, the system further includes the machine-learning module associated with the neural network. In some embodiments, the machine-learning module may be configured to iteratively determine the plurality of aggregated gaze reference vectors respectively associated with the plurality of reference image data.

In some embodiments, one or more weighting values determined with the weighting module may be used to update the neural network. Embodiments may also include determining the weighting values associated with the one or more of the plurality of aggregated gaze reference vectors. Embodiments may also include selecting the target point of regard at a point on an eye panel controller using the weighting values associated with the one or more of the plurality of aggregated gaze reference vectors.

In an embodiment, the machine-learning module 134 includes a differential gaze analyzer module to train as described herein. In embodiments, the differential gaze analyzer module includes a relative gaze analyzer module.

Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein one or more networks can connect the multiple hosts.

In the example of FIG. 1, each of the modules in the system 100 may be a dedicated hardware block/component including one or more microprocessors and on-chip memory units storing software instructions programmed by a user for various machine-learning operations. When the software instructions are executed by the microprocessors, each of the hardware components may become a special purposed hardware component for practicing certain machine learning functions as discussed in detail herein. In some embodiments, the system 100 is on a single chip, e.g., a system-on-chip (SOC).

In some embodiments, training data that may be used by the machine-learning module 134 for the machine-learning operation to identify the subject in the image, wherein the training data may optionally include a calculation with respective weights.

In the example of FIG. 1, the machine-learning module 134 is configured to receive and interpret a plurality of machine-learning commands for a machine-learning operation. In some embodiments, the machine-learning module 134 is configured to save the plurality of machine-learning commands in a machine-learning command RAM.

In some embodiments, the machine-learning module 134 is configured to execute any software code written through a common high-level language. In embodiments, the machine-learning module 134 may be configured to process a plurality of performance non-critical operations, e.g., data/instruction preparatory work, data collection, data mapping, etc. In some embodiments, the machine-learning module 134 may also be configured to breakdown the received machine learning commands into performance critical and noncritical operations/tasks such that the performance non-critical operations can be processed the machine-learning module 134 and the performance critical operations (e.g., matrix multiplication) can be processed by another engine, processor or module. In embodiments, the machine-learning module 134 may be configured to divide the plurality of machine-learning commands for efficient execution thereof. In embodiments, the machine-learning module 134 may also be configured to assign/divide the plurality of machine-learning commands (also referred to as tasks or sub-tasks) to various components for processing. In embodiments, the machine-learning module 134 may be configured to allocate one or more locations in the database 140 for storing of tasks/commands, the data, result after the data is processed, etc. to be accessed and used by the machine learning module 134. As such, the machine-learning module is configured to execute the entire machine-learning algorithms and the operation instead of having to rely on or require another module or engine to execute certain machine-learning commands or operations. In embodiments, the machine-learning module 134 may eliminate performance overhead of transferring data to execute any non-supported machine-learning operations and thereby reduces burden on the system to achieve a higher performance.

In embodiments, the machine-learning module 134 may be configured to break down a top-level task, e.g., a machine-learning operation, specified by an executable command into a plurality of sub-tasks and instruct or program other components/blocks on the system 100 to execute those sub-tasks in a coordinated fashion. In embodiments, the machine-learning module 134 may processes performance non-critical operations.

In embodiments, the machine-learning module iteratively determines an aggregation of eye reference points. In embodiments, the machine-learning module includes an adaptive moment estimation method, for example, an ADAM optimizer. In embodiments, the adaptive moment estimation method includes first and second moments of a particular gradient to adapt a learning rate associated with one or more weighting factors of the neural network.

In embodiments, the initial learning rate includes 0.0001-0.0005, where the batch size of the reference pairs is set to 50. In embodiments, the gaze estimation method includes a baseline model of 25 epochs. In this embodiment, the learning rate is decayed by a factor of 0.1-0.3 every 10-30 epochs.

In embodiments, localization of the target point of regard is relative to the saved reference point of regard. In embodiments, the training process includes pairs of relative gaze estimations to estimate the target point of regard in real-time. In embodiments, the training process is unobstructive, for example, passive. In other embodiments, the training process may be activated by the user. In an embodiment, the machine-learning module iteratively determines the aggregation of eye reference points of regard for one or both eye patches associated with eyes of the user. In an embodiment, the machine-learning module may further select an eye reference aggregation using the aggregated eye reference points of regard and the target point of regard.

In an embodiment, the machine-learning module may generate a user-specific training function. In an additional embodiment, the machine-learning module may generate a non-user-specific training function. In an additional embodiment, one or more training function may be generated by training the CNN as described in more detail herein.

In embodiments of the expression module 136, a gesture associated with the user and the user face may be detected. In an example embodiment, upon detection one of a blink and a wink during a user gaze fixation, the one of the blink and the wink is filtered from the image data such that the image data does not include the one of the blink and the wink as part of the eye gesture that operates the eye panel controller or that is used to determine an associated point of regard of the display. In embodiments, the user gaze fixation includes a prolonged look or staring at the particular point of regard.

Figure 2:
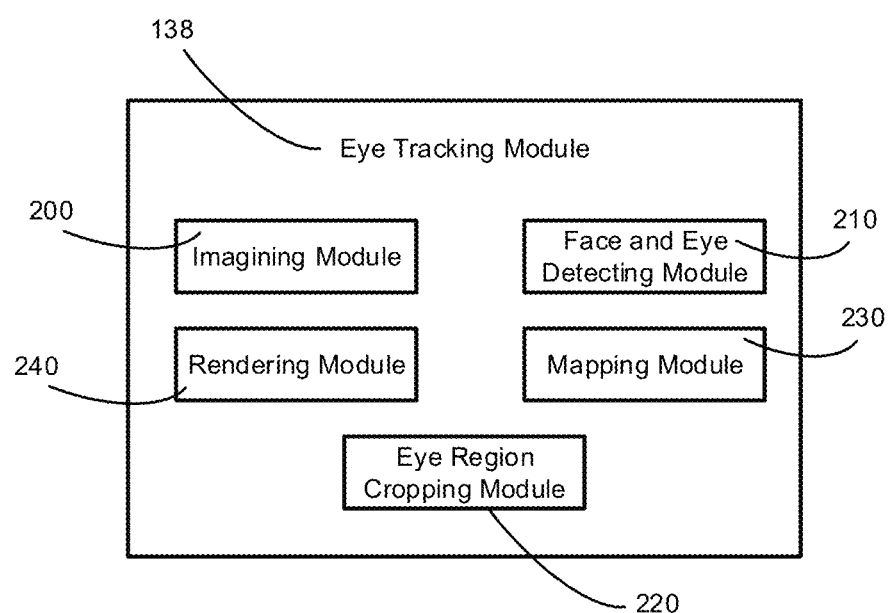
FIG. 2 illustrates an eye-tracking module, according to an example embodiment.

FIG. 2 illustrates an eye-tracking module 138 according to an embodiment. The eye tracking module 138 may include one or more of the following: an imaging module 200, a face and eye detecting module 210, an eye region cropping module 220, a mapping module 230 associated with the target point of regard, and a rendering module 240.

In an embodiment, an eye-tracking module may be configured to extract the eye features using a plurality of convolutional layers associated with CNN. In an embodiment, the target point of regard may be determined using at least one of: the imaging module, the face detection module, and the eye-region cropping module to identify an image of one or more eye patches associated with the user for the CNN. In an embodiment, the one or more eye patches associated with the user include one or both eyes on the face of the user. The one or more eye patches may be extracted from an image associated with the face or with the head of the user, according to an embodiment. The one or more eye patches may be extracted spatial (e.g., facial) features corresponding to the one or both eyes of the user according to an example embodiment. For one or more captured image, the method may include using an eye-tracking module 138 configured to extract a set of eye features using a plurality of convolutional layers associated with CNN according to embodiments.

In an embodiment, the rendering module includes an engine that may take a raw gaze (in cm) and may map the raw gaze to digital pixels on the display. In this embodiment, the eye-tracking-module 138 includes a general term comprised of a plurality of information needed to generate a raw prediction of gaze. The "eye-tracking-module" and the "gaze analyzer" module include the CNN mechanism together with trained data according to embodiments.

In an embodiment, the target point of regard may be determined using at least one of: an imaging module, a face detection module, and an eye-region cropping module to identify an image of one or more eye patches associated with the user for the CNN. In an embodiment, the one or more eye patches associated with the user include one or both eyes on the face of the user. The one or more eye patches may be extracted from an image associated with the face or with the head of the user, according to an embodiment. The one or more eye patches may be extracted spatial (e.g., facial) features corresponding to the one or both eyes of the user.

Figure 3:
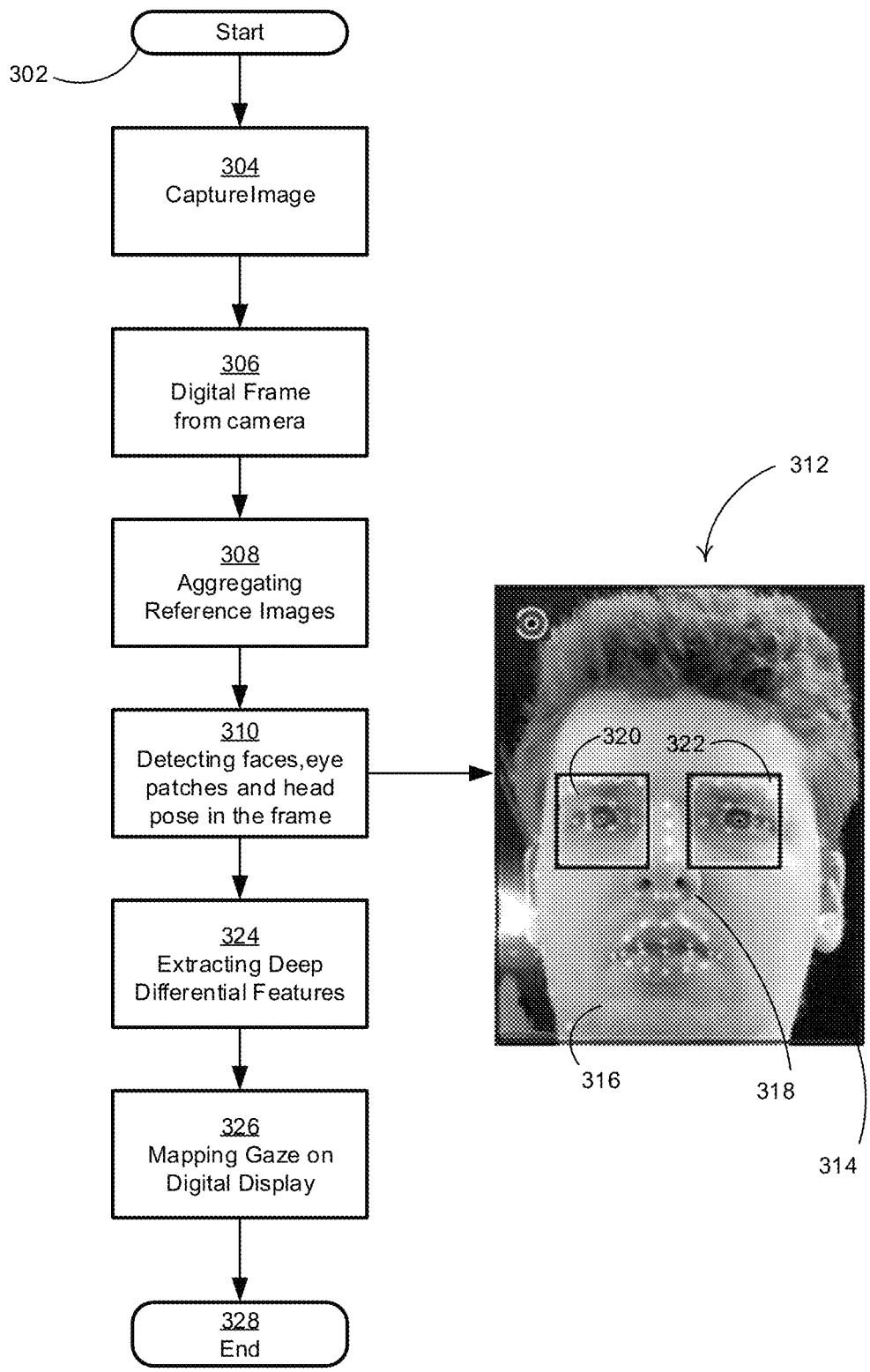
FIGS. 3 and 4 illustrate flowcharts for processes used to estimate a user gaze, according to some embodiments of the present disclosure.

FIG. 3 illustrates a flow chart 300 for a process to estimate a user gaze, according to some embodiments of the present disclosure. The flow chart begins at 302 according to an embodiment.

At 304, the camera may capture the image of the user according to an embodiment. At 306, the frame may be determined by the captured image from the camera according to an embodiment. At 308, the reference images may be aggregated according to an embodiment. At 310, the face, eye patches and/or head pose may be extracted from the frame according to an embodiment. At 312, the frame 314 captures an image of the user 316 according to an embodiment. The user may have facial features 318 recognized by the image processor according to an embodiment.

One or more eye patches 320, 322 may be extracted from the image at 312 according to an embodiment. At 324, deep relative features are extracted according to an embodiment. At 326, a gaze of the user may be mapped to the digital display according to an embodiment. At 328, the flow chart ends according to an embodiment.

In embodiments, the aggregation of reference pairs includes a summation of the reference pairs. In embodiments, the target point of regard is determined using a learning process associated with the neural network and the machine-learning module. In an embodiment, the target point of regard includes a point of regard on the display associated with a user's relative gaze direction. The target point of regard may be mapped to a display according to an embodiment. In embodiments, the target point of regard is determined using the user image data from the camera capturing the user's physiological features of the eye. In embodiments, the physiological features of the eye are extracted as eye patches from the head image data.

In embodiments, a set of user head images with associated reference points of regard mapped to a digital display is used to create the reference pairs of the trained neural network. In embodiments of the systems, methods, and programs provided herein, a weighted aggregation of reference points of regard are used to estimate a target point of regard for the user for a user image frame captured by the digital camera.

The systems, methods, and programs provided may allow for a target point of regard estimation to be determined according to embodiments. The target point of regard may be determined using seamless adaptation process, which may capture intra-user eye behavior. The relative estimation may not be limited to several user reference points of regard and may utilize up to an infinite amount of reference points of regard and image pairs to optimize a prediction of the user's point of regard. Embodiments herein may be used in changing environmental conditions. Embodiments herein may assume that the internal eye parameters, features and characteristics may remain the same for a specific user.

In some embodiments, the camera may be further configured to determine one or more facial landmarks associated with the user image data. In some embodiments, the system further includes an expression module configured to determine one or more facial expressions using the one or more facial landmarks. In some embodiments, the target eye patch image data includes a left target eye patch image data and a right target eye patch image data.

In some embodiments, the target eye patch image data includes two visible eyes in a frame at a predetermined resolution threshold. In some embodiments, the target eye patch image data excludes an image frame where a blink may be detected. In some embodiments, the target eye patch image data excludes an image frame outside a range of the resolution of (96×48, 192×96, 384×192).

Figure 4:
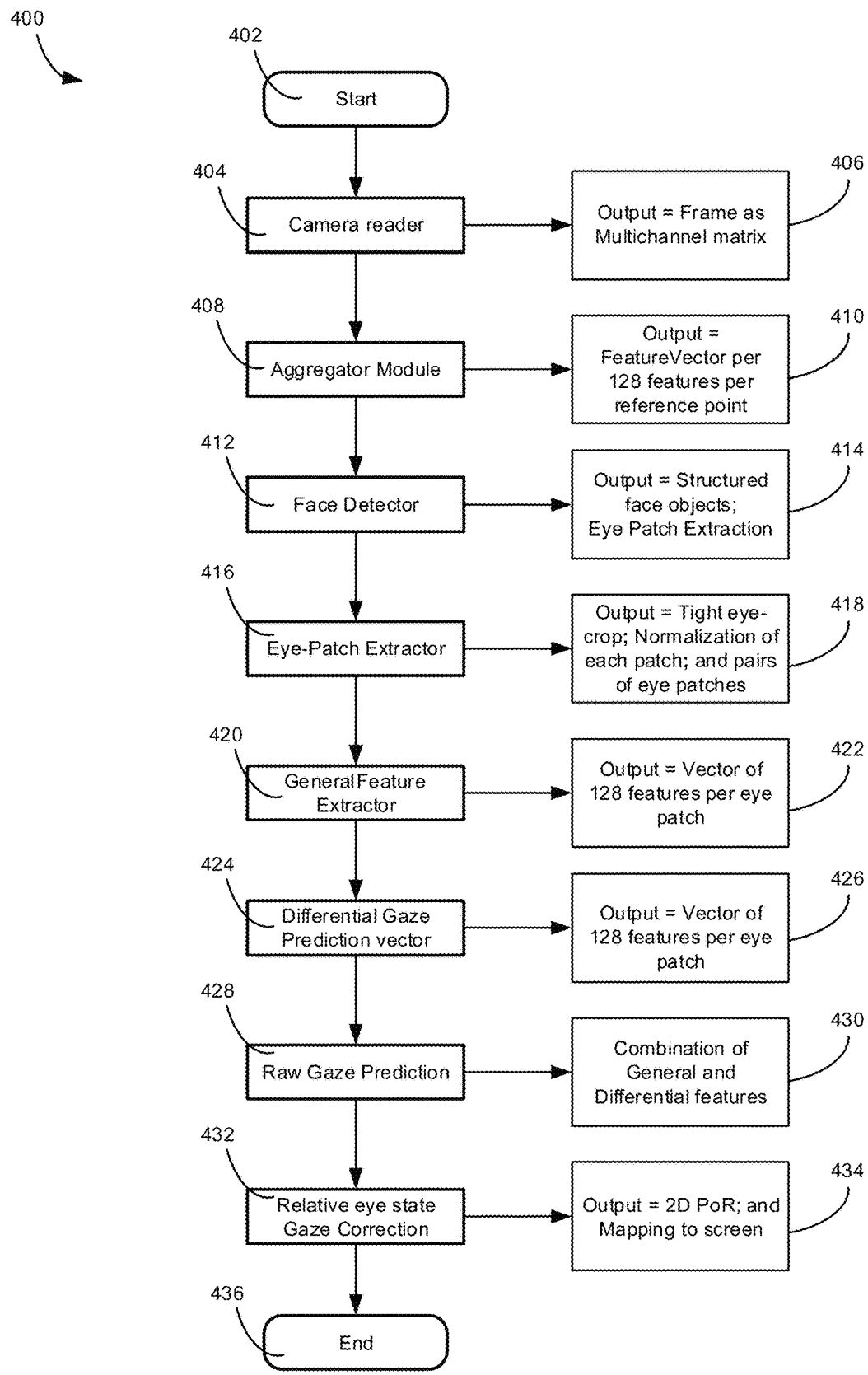

FIG. 4 illustrates a flow chart 400 for a process to estimate a user gaze, according to some embodiments of the present disclosure. At 402, the flow chart begins according to an embodiment.

At 404, a camera, such as an image sensor, captures image data according to an embodiment. In embodiments, the camera or the image processor reads the image data captured by the camera. The output 406 associated with the camera reader includes a frame, such as a multichannel matrix according to an embodiment.

At 408, the system 400 includes an aggregator module according to an embodiment. At 410, the output of the module 408 includes a feature vector including 128 features per reference point.

At 412, the system 400 includes a face detector according to an embodiment. At 414, the output includes structured face objects and eye patch configured for extracting according to an embodiment.

In an embodiment, a face detector 412 includes a list of structured face objects and one or more of the following: a crop of the face, a bounding box of the face with respect to an image frame, a 6D head pose, and training sets including a set of image with associated point of regard reference pairs for one or more user. In an embodiment, the reference pairs of image with associated point of regard ("reference pairs") may be selected based on an increasing distance between the display and the user.

In an embodiment, the face detector 412 may generate training input from a first image from the camera. In an embodiment, the face detector may determine a reference image from the first image and a reference point of regard associated with the reference image. In an embodiment, the face detector may repeat this training input for subsequent aggregations using the neural network.

At 416, the system 400 includes an eye patch extractor according to an embodiment. In embodiments, the eye patch extractor may extract spatial features from one or more of the images corresponding to one or both eyes. Spatial features include features that are taken from the 2D digital image according to embodiments. Spatial features, such as head pose, may be received by the neural network as a six degrees of freedom vector. The six degrees of freedom vector may be derived from pixels values. At 418, the output includes a tight eye crop, normalization of each patch, and a pair of eye patches according to an embodiment.

In embodiments, the eye patch extracted at 416 may be between about 128×128 pixels and about 512×512 pixels. In embodiments, the eye patch has eye image data as two-dimensional coordinates as input into the neural network, and the associated point of regard of the display is output from the neural network. In an embodiment, the eye patch extractor at 416 may detect eye landmarks in the facial landmarks in the head image data. In an embodiment, the eye landmarks may be used to determine bounding boxes for one or both eyes with respect to the frame of the image. In an embodiment, the plurality of aggregated gaze reference vectors may comprise an aggregate of reference points of regard. In an embodiment, the feature vector has a size in a range of about 128 to about 256.

At 420, the system 400 includes a general feature extractor according to an embodiment. At 422, the output includes a first vector of 128 features per eye patch according to an embodiment.

At 424, the system 400 includes a differential gaze prediction vector according to an embodiment. In embodiments, the differential gaze prediction vector includes a relative gaze prediction vector. At 426, the output includes a second vector of 128 features per eye patch according to an embodiment.

At 428, the system 400 includes a raw gaze prediction according to an embodiment. In an embodiment, before the target point of regard is determined, the aggregated reference pairs generate a raw gaze prediction.

In an embodiment, a raw gaze prediction for a raw gaze point of regard may be determined according to an embodiment. In an embodiment, a training of the neural network includes generating a raw gaze prediction. In an embodiment, the training of the neural network includes detecting a face of the user using a camera; cropping or extracting eye patches from the image of the face; determining a 6D head pose of the user from the image; generating a raw gaze inference on the display; classifying an eye-state of the user by determining if the eye state is closed or open for one or both eyes on the face; collecting a plurality of reference points of regard associated with the user images with head position; aggregating or clustering the plurality of reference points of regard; and determining the target point of regard for one or both eyes. In embodiments, the raw gaze prediction may be generated, for one or more captured frames, by detecting the face of the user; cropping one or more eye patches from the face; determining a 6D head pose of the user; generating a raw gaze inference on the display; classifying an eye state of the one or more eye patches as open or closed, collecting a number of reference points of regard on the display; cluster the reference number of known points; and based on the cluster, determine the raw gaze point of regard for one or both eyes.

In embodiments, a target point of regard determined on the eye panel controller is preceded by a raw gaze prediction for one or more captured image. The raw gaze prediction may include the estimation of the target point of regard without using a relative point of regard. In this embodiment, the raw gaze prediction may be based directly from the digital image of the user and a ground truth position on the display. In this embodiment, a raw gaze inference may include an estimate of the target point of regard based on the digital image input of the user, without using any reference points of regard or their corresponding images.

In embodiments, the raw gaze predictor includes output based on regression as described herein. In embodiments, aggregation of point-of-regard regression and relative regression is mapped to the 2D point of regard on the display. At 430, the output includes a combination of general and relative features according to an embodiment.

At 432, the system 400 includes a relative eye state gaze correction according to an embodiment. At 434, the output includes a 2D point of regard, and a mapping to the display according to an embodiment.

In embodiments, output of corrected gaze estimator includes a point of regard and a region selection for one or more detected face.

At 436, the flow of the system 400 ends according to an embodiment.

In an embodiment, a plurality of relative-feature-vectors (RFV) associated, respectively, with reference points of regard may be aggregated in associated reference pairs, for example, reference pairs in the neural network. In an embodiment, the plurality of relative-feature-vectors (RFV) includes a plurality of aggregated gaze reference vectors. In an embodiment, the aggregation may be non-linear. In an embodiment, the non-linear aggregation may be aggregated into a single relative feature space (RFS).

In embodiments, the reference of reference vectors, reference points of regard and reference image data may refer to vectors, points of regard or image data associated with training the neural network. In an embodiment, the neural network comprises the machine-learning module. In embodiments, the reference of the reference vectors, reference points, and reference image data is associated with a specific user and the reference vectors, the reference points, and the reference image data may be recorded in the database and associated with the specific user or a user device.

In an embodiment, the aggregated gaze reference vectors are associated with one or more of the following: a reference point of regard, a relative point of regard, a differential point of regard, a differential gaze vector, a reference vector, a trained vector, trained points of regard, a raw gaze vector, raw gaze points of regard, labeled points of regard associated with ground truth data, previous points of regard, and previously saved user points of regard.

In an embodiment, the target point of regard is associated with an inference point of regard. In an embodiment, the target point of regard is estimated using the trained neural network. In an embodiment, the target point of regard is predicted using the trained neural network.

In embodiments, the reference point of regard includes a spatial location on the 2D digital display. In embodiments, the reference point of regard includes a point of regard associated with training of the neural network. In embodiments, the reference point of regard includes the reference point of regard. In embodiments, the reference point of regard is associated with a reference image. In embodiments, the reference image includes the image of the user that is captured at an instance when a user is gazing at, such as looking at or focusing on, the associated reference point. The reference point of regard and the associated reference image are reference paired and recorded together for the user as the image/point of regard reference pair. In embodiments, at an inference time at which a user is gazing at the display, the aggregate reference pair of the user is used to predict or estimate the target gaze point, for example, the target point of regard.

In embodiments, the reference point of regard is associated with a reference image in the reference pairs. In embodiments, the reference image may correspond with the reference points of regard on the 2D digital display and be used to infer, for example, estimate, a current point of regard of the user.

In embodiments, the reference images are captured by the digital camera during a training session and saved in the database. In this embodiment, the user is gazing at the reference point of regard on the 2D digital display during image capture.

In embodiments, the reference images are compared with a target image, such as a current image of the user as the user gazes at the target point of regard. In embodiments, the target image is captured and then used to estimate the target point of regard.

In embodiments, the target point of regard includes a gaze estimation, such as a gaze estimation vector. In embodiments, the gaze estimation is based on the reference images previously captured and reference paired. In embodiments, a reference gaze estimation method is described herein. The reference gaze estimation method may include a calibration estimation method and a baseline gaze estimation method. The baseline gaze estimation method may be determined using the training neural network as described herein. In embodiments, the reference gaze estimation method comprises extraction of one or more eye patches from the head image data.

For one or more set of images in a size of batch between about 50 to 150 image reference pairs, training methods are described according to embodiments. A combinatorial vector for the target point of regard is determined. A reference point of regard is used for training the machine-learning module. In an embodiment, the machine-learning module includes a differential analyzer module that may use relative points of regard to determine the target point of regard. In embodiments, the relative points of regard may be aggregated as described herein.

Epochs include reference times at which images are taken according to embodiments. For a number of epochs, such as 150 to 250 epochs, for one or more batches, batch normalization is used according to embodiments. In embodiments, batch normalization includes a method to accelerate artificial neural network training, and may make the artificial neural network more stable. The batch normalization may make the artificial neural networks faster through normalization of the layers' inputs by re-centering and re-scaling.

In an embodiment, an eye patch descriptor ("EPD") may be determined by one or more general eye patch image features. In an embodiment, there are 128 general eye patch image features for one or both eyes based on the neural network. In an embodiment, a plurality of relative eye patch features may be determined by a plurality of eye patch image features extracted from the image of the user. In an embodiment, there may be 128 relative eye patch features associated with one or more aggregation of a relative pairs of aggregated data based on the neural network. In an embodiment, the eye patch frame includes a resolution in a range of about 128×128 to about 512×512. In an embodiment, the salient features, e.g., characteristics, of a user face may be used for the neural network. In an embodiment the salient features of the user includes ocular dominance.

Figure 5A:
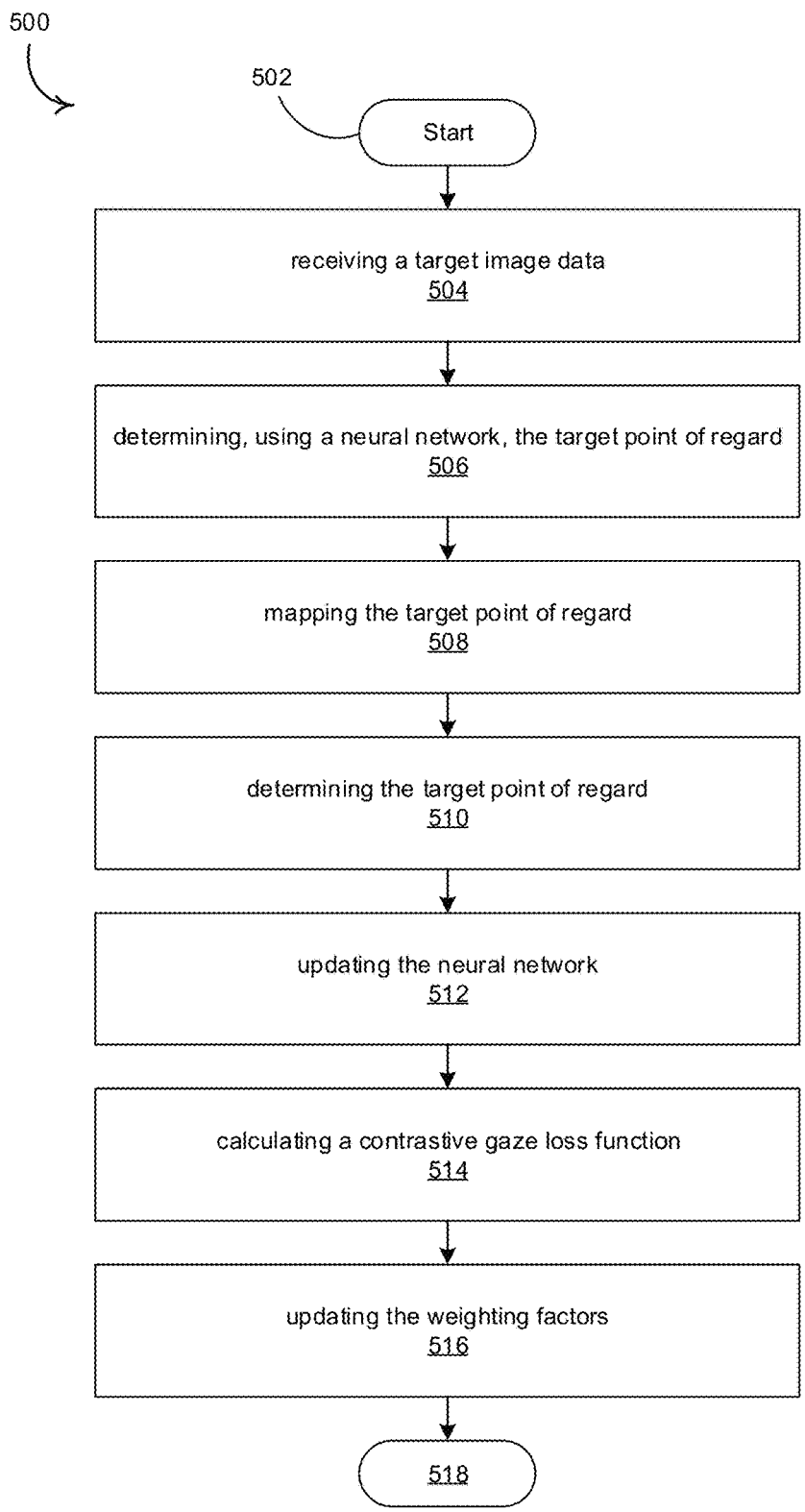
FIGS. 5A to 5B illustrate a flowchart for a process used to estimate a user gaze, according to some embodiments of the present disclosure.
Figure 5B:
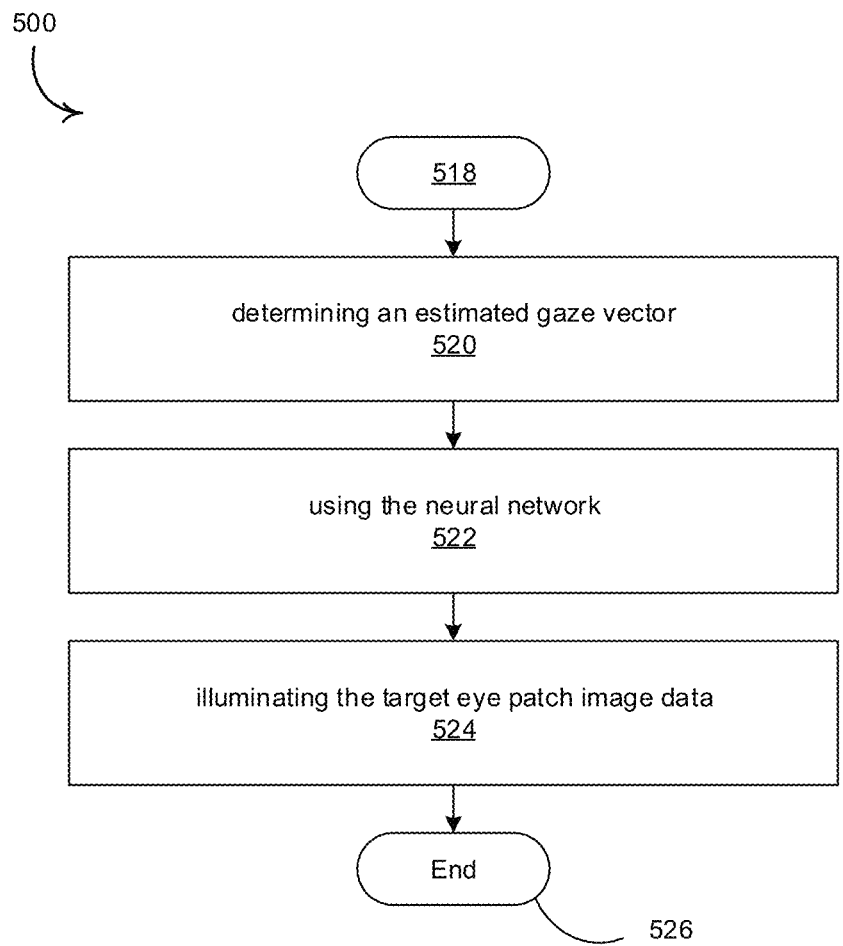

FIGS. 5A to 5B illustrate a flowchart 500 for a process to estimate a user gaze, according to some embodiments of the present disclosure. At 502, the method may begin and may include at 504 receiving a target image data associated with the user from a camera coupled with the display. In some embodiments, the target image data may include a target eye patch image data associated with the user. At 506, the method may include determining, using a neural network, the target point of regard associated with the target image data may be based on the target eye patch image data.

In some embodiments, a plurality of reference image data associated with the user, the plurality of reference image data respectively associated with the plurality of aggregated gaze reference vectors. In some embodiments, the target point of regard may be determined within a predetermined threshold. At 508, the method may include mapping the target point of regard onto the display.

At 510, the method may include, determining the target point of regard further comprises: The method may include associating a weighting factor with one or more reference image data of the plurality of reference image data based on a probability of a match between the target eye patch image data and the one or more reference image data. The method may include using the weighting factor of the one or more reference image data to determine the target point of regard within the predetermined threshold.

At 512, the method may include, updating the neural network with the target point of regard, and the associated target image data. At 514, the method may include, calculating a contrastive gaze loss function to determine a gaze error associated with the target point of regard. At 516, the method may include, updating the weighting factors using a back-propagation calculation. In some embodiments, the back-propagation calculation may include one or more of a stochastic gradient descent algorithm and an adaptive moment estimation algorithm.

At 518, the method may include many steps in the process not shown in the FIG. 5, for example, determining a target 6D head position associated with the target head region image data. The method may include determining a reference 6D head position associated with the reference head region image data. The method may include determining a target 3D eye position associated with the target eye patch image data. In some embodiments, the mapping the target point of regard onto the display may further comprise mapping to one of rendered content on the display, 2D coordinates associated with the display, 3D coordinates associated with the display, and pixels associated with the display.

The method may include selecting a region of interest via an eye gesture associated with the user. The method may include converting the selected region of interest and the associated eye gesture to computer-readable data to execute a command in an operating system associated with the display. In some embodiments, a selected region of interest associated with the target point of regard may be associated with one or more of the following for the display: a single point, text, a single pixel, a cursor position, a 3D graphical rendering, a 2D graphical rendering, a range of text, a word, a 2D area, and a 3D area. In some embodiments, dimensions associated with the target point of regard may exceed spatial dimensions of the display.

In some embodiments, the target point of regard may refer to a particular moment in time for rendered content that changes over time. In some embodiments, the rendered content may include one or more of text content and image content displayed within the display. In some embodiments, the target point of regard may be determined based on one or more of the following: rendered content for the display, content focus, and content selection.

The method may include receiving the content focus and the content selection through an input module for an operating system. In some embodiments, the content focus and the content selection may be associated with one or more eye gestures at the target point of regard.

The method may include determining a first blink associated with the target eye patch image data of the user, and a second blink associated with the target eye patch image data of the user. The method may include determining a time difference between one or more of the following: In some embodiments, a beginning of the first blink and a beginning of the second blink, an end time of the first blink and an end time of the second blink, and a first time during the first blink and a first time during the second blink.

The method may include determining a blink rate using the time difference. The method may include determining a probability of a blink during an image capture, based on the blink rate. In some embodiments, the plurality of aggregated gaze reference vectors, associated with the plurality of reference image data, respectively, may be determined using one or more of the following: receiving a first head image data having a first eye position and a first head position in response to rendered content displayed in the display at a reference point of regard in the display, using the first eye position, the first head position, the reference point of regard in the display, and the weighted reference image data; a first gaze reference vector associated with first head image data. The method may include updating the plurality of aggregated gaze reference vectors with the first gaze reference vector. The method may include updating the plurality of aggregated gaze reference vectors with the target point of regard associated with the target image data. The method may include receiving a first head image data having a first eye position and a first head position, a second head image data having a second eye position and a second head position, and a third head image data having a third eye position and a third head position.

At 520, the method may include determining an estimated gaze vector associated with the third eye position based on the first head image data and the second head image data. At 522, the method may include using the neural network to estimate a future point of regard associated with the user on a 3D display. At 524, the method may include receiving the target eye patch image data associated with the user to determine one or more of eye characteristics, eye position, and gaze position. In some embodiments, receiving may include an infrared light source through a camera lens in a frequency range of about 4000 cm-1 to about 12,500 cm-1. In some embodiments, receiving may include a visible light source through the camera lens in a frequency range of about 12,500 cm-1 to about 26,300 cm-1.

Figure 6:
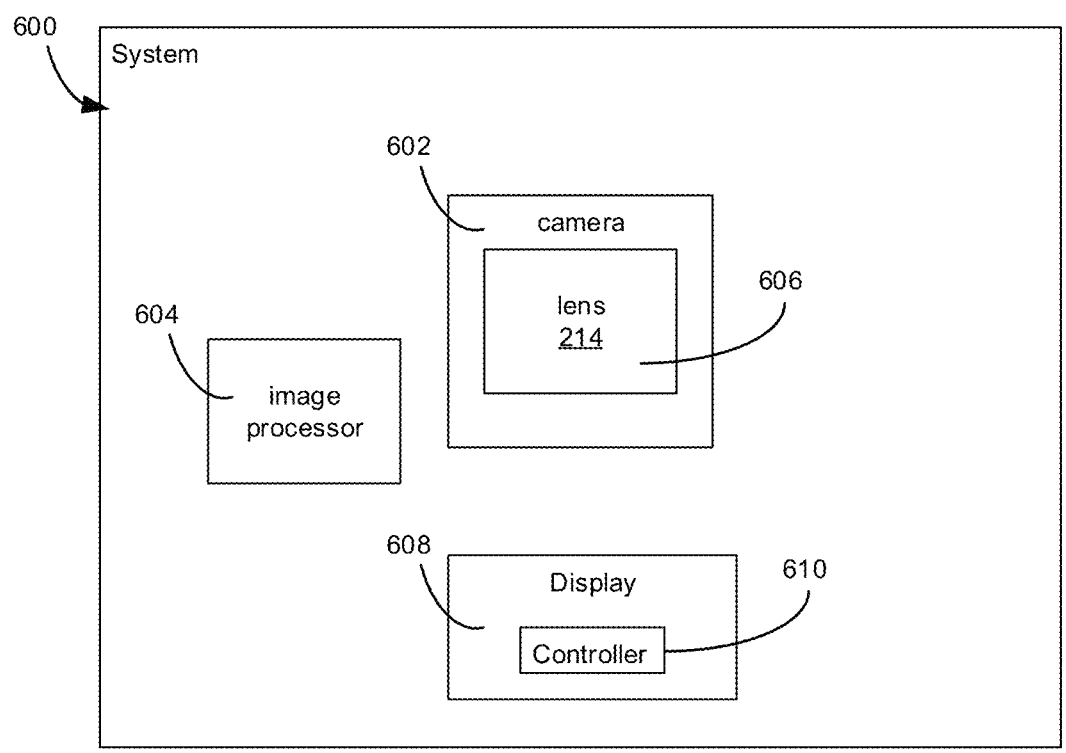
FIG. 6 illustrates a block diagram of a gaze estimation system, according to some embodiments of the present disclosure.

FIG. 6 illustrates a block diagram of a gaze estimation system 600, according to some embodiments of the present disclosure. In some embodiments, the system 600 may also include a camera 602 to capture a user image, and an image processor 604 to process image data and control image capture. Embodiments may also include the camera 602 coupled with the image processor 604 and configured to capture the user image data. In some embodiments, a field of view associated with the camera includes a region having a distance at least 30 cm from the camera. In some embodiments, the camera 602 includes a lens 606 with an aperture through which light travels to capture the user image data.

In embodiments, the camera includes a digital camera that captures images of a user's head. In embodiments, the camera may capture a large number of images. In embodiments, the camera may have a speed of between about 30 frames per second and about 120 frames per second, depending on the particular camera. In embodiments, the digital camera may comprise one or more lens through which light may penetrate.

In embodiments, the camera is an infrared camera. In embodiments, the camera uses light within the visible spectrum. In embodiments, the image processor may receive and process the captured images from the camera.

In some embodiments, the system 600 may also include a display 608 and an eye panel controller 610 on the display 608. In some embodiments, the image processor may be configured to determine, from the user image data, target head region image data and target eye patch image data. Embodiments may also include using a neural network to determine the target point of regard associated with the user image data, using on the target eye patch image data. In some embodiments, the target point of regard may be determined within a predetermined threshold.

In some embodiments, the target point of regard may be mapped to coordinates associated with the eye panel controller. In some embodiments, the mapped coordinates may be associated with one of 2D coordinates of the eye panel controller or 3D coordinates of the eye panel controller.

In some embodiments, the mapped coordinates may be associated with gaze fixation coordinates determined in region of interest on the eye panel controller 610. The region of interest may be selected by the eye gestures as described herein. Embodiments may also include converting the selected region of interest and the eye gestures to computer-readable data to execute a command in an operating system associated with the eye panel controller. In some embodiments, the eye gestures may be associated with one or more input modules for the operating system. In some embodiments, the target point of regard may be associated with the gaze fixation coordinates including rendered content in the eye panel controller. In an embodiment, the target point of regard is the estimated gaze destination associated with the user. In some embodiments, the rendered content includes one or more of text content and image content displayed on the eye panel controller.

Embodiments may also include dimensions associated with the target point of regard exceed spatial dimensions of the eye panel controller. In some embodiments, the target point of regard may be associated with a particular moment in time for rendered content configured to change over time. In some embodiments, the rendered content includes one or more of text content and image content displayed within the eye panel controller.

In some embodiments, the image processor may be further configured to estimate a future point of regard, associated with the user, on the eye panel controller. The target head region image data may be used to determine a 6D head position, and the target eye patch image data may be used to determine a 3D eye position. The camera 602 may be further configured to determine one or more facial landmarks associated with the user image data. The target eye patch image data may exclude an image where a blink may be detected. The target eye patch image data may exclude an image outside a range of this resolution.

The eye panel controller 610 may include a digital display that projects 3D content accessible by the user and may be configured to be selected using one or more eye gestures. In some embodiments, the one or more eye gestures include one or more of the following: a fixation in a dwell-time, blinks, blinks at different time intervals, blinks at different lengths of time, winks, winks at different time intervals, and winks at different lengths of time.

The target point of regard may be mapped to coordinates associated with the eye panel controller in an embodiment. One or more of text content and image content may be displayed on the eye panel controller.

In embodiments, the reference resolution threshold includes a resolution of 96×48, 192×96, and 384×192. In embodiments, a size of the eye patch includes a minimal specified size to have a valid estimation of the target point of regard. In another embodiment, the neural network may rescale the image data and the associated point of regard to have a valid estimate of the target point of regard.

In embodiments, the eye panel controller includes a first set of dimensions associated with target point of regard and associated user images. In embodiments, the first set of dimensions includes an aggregation of the display resolution, the field of view of the camera, and a distance of the user from the camera. In embodiments, the first set of dimensions may comprise about 2 pixels per millimeter.

FIG. 7 is a diagram illustrating six degrees of freedom associated with a user head pose, according to some embodiments of the present disclosure. In embodiments, the head pose may include a head position and a head orientation. The head position of the user may include a determination of six degrees of freedom. The head orientation may include roll, pitch, and yaw. In some embodiments, the target head region image data may be used to determine a 6D head position, and the target eye patch image data may be used to determine a 3D eye position. In some embodiments, the 6D head position may include a head position and a head orientation. In some embodiments, the head position includes a determination of six degrees of freedom. In some embodiments, the six degrees of freedom includes the head position using three degrees of freedom of spatial location, and the head orientation including roll, pitch and yaw.

FIG. 8 is a diagram illustrating a user eye gaze at a target point of regard on a display, according to some embodiments of the present disclosure. FIG. 8 depicts a system 800 illustrating estimating a user eye gaze 802 at a display 804, according to some embodiments of the present disclosure. In this embodiment, the display 804 is coupled with the camera 806. In some embodiments, the system 800 may also include rendered content in the eye panel controller 808 of the display. The target point of regard may be illustrated here as coordinates of (Xscreen, Yscreen), as the target point of regard may be configured to be gazed upon by the user. In embodiments, the target point of regard is output in a distance measurement per pixel, for example, cm/pixel or mm/pixel.

The system may also include gaze fixation or selection through gestures including dwell-time, blinks, blinks at different time intervals, blinks at different lengths of time, winks, winks at different time intervals, and winks at different lengths of time. The system 800 also shows a heat map 810 on the display to illustrate that the target point of regard is selected based on the aggregated and weighted reference vectors and associated gaze reference images.

Figure 9:
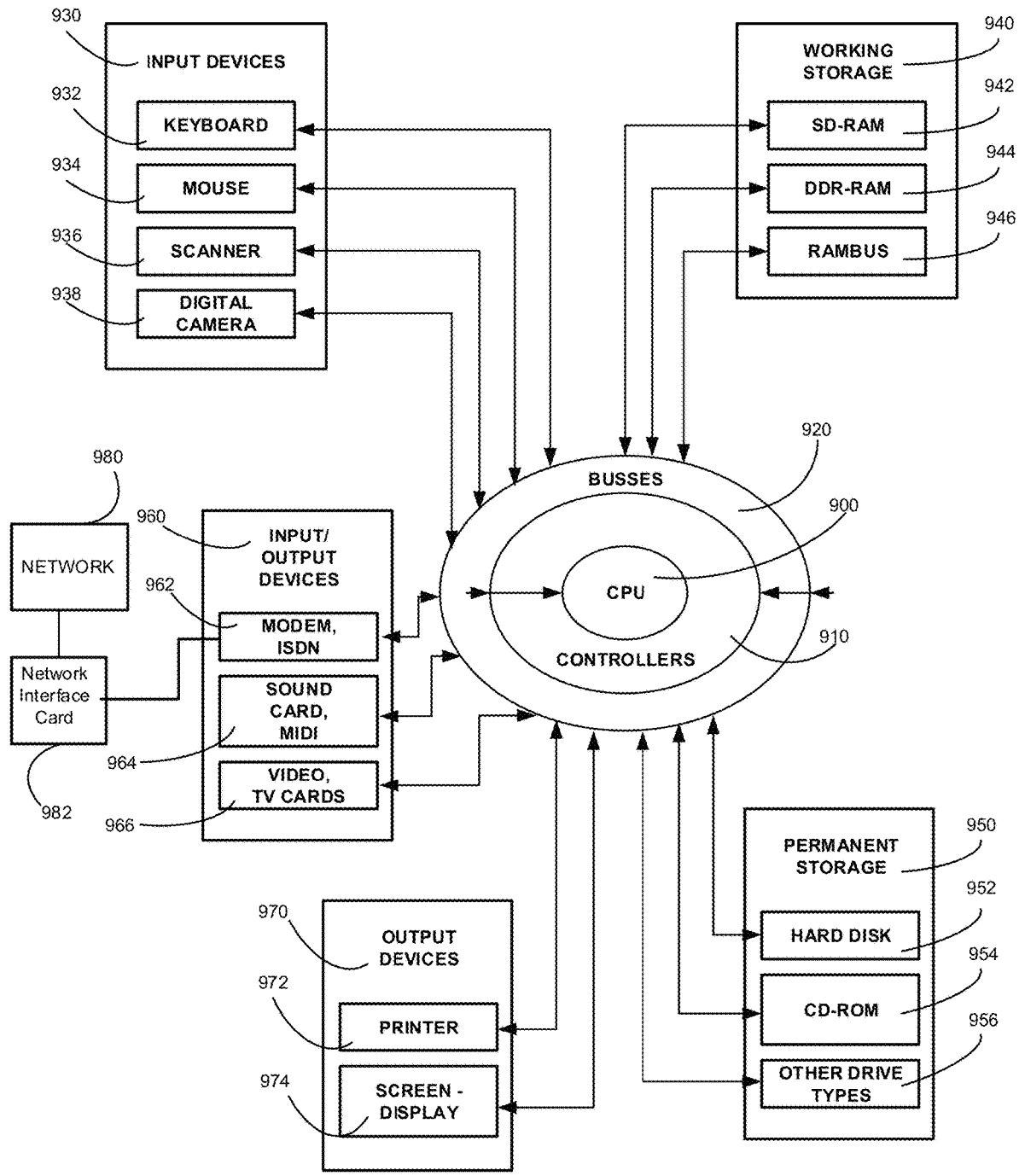
FIG. 9 illustrates a block diagram of an overview flow chart of a computer system network deployment of an embodiment of the present invention.

FIG. 9 illustrates a block diagram of an overview flow chart of a computer system network deployment of an embodiment of the present invention. FIG. 9 illustrates a block diagram of an overview flow chart of a computer system network deployment in an embodiment of the present invention. FIG. 9 shows a computer system connected to components through the system to increase transmission and, therefore, increase processing time. The bus system may provide light speed connectivity to the components including a CPU/processor 900 that transmits instructions to direct the operations and function of the components connected to the controllers 910 through bus 920 in an embodiment of the present invention. In embodiments, CPU/processor 900 may be used for calculation processes.

In embodiments, input devices 930 may include one or more of a keyboard 932, a mouse 934, a scanner 936, and a camera 938 as described in more detail herein. An alphanumeric input device may include the keyboard and the user interface (UI). The mouse may enable the user to create input into the computer system.

In embodiments, a working storage 940 may include a SD RAM 942, DDR RAM 944, and RAMBUS 946. In embodiments, a main memory or main storage 950 may include a hard disk drive 952, a CD ROM drive 954, or solid state storage 956.

In embodiments, input/output devices 960 of the system may include a modem or ISDN 962, a sound card or MDI 964, and a video/TV card 966. A network 980 may be coupled with the modem 962 through a network interface card 982. In embodiments, output devices 970 of the system may include a printer 972 and a display 974 as described herein in more detail.

The software may reside, completely or at least partially, within the main memory and/or within the processor during execution thereof by the computer system. The main memory 950 and the processor 900 may constitute a machine-readable medium. In embodiments the software may include programming to transmit data through the bus 920. The software may further be transmitted or received over a network 980 utilizing any one of a number of well-known transfer protocols, such as HTTP.

In embodiments, the network interface card 982 may include the modem or a network router to allow components to transmit and receive data to and from a network 980. The connection may include a USB plug or PCI slot. The connection of the computer system to a network 980 allows a system of components to operate with other systems or components also connected to the network in an embodiment of the present invention.

In alternative embodiments, the computer system may operate as a standalone device or may be connected (e.g., networked) to other computer systems. In a networked deployment, the computer system may operate in the capacity of a server or a client computer system in server-client network environment, or as a peer computer system in a peer-to-peer (or distributed) network environment. The computer system may be a personal computer (PC), a tablet PC, a set-top box (STB), a Personal Digital Assistant (PDA), a cellular telephone, a web appliance, a network router, switch or bridge, or any computer system capable of executing a set of instructions (sequential or otherwise) that specify actions to be taken by that computer system. Further, while only a single computer system is illustrated, the term computer system shall also be taken to include any collection of machines or components that individually or jointly execute a set (or multiple sets) of instructions to perform any one or more of the methodologies discussed herein.

While the machine-readable medium is shown in this example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, color media, optical media, and magnetic media.

In example embodiments, a computer system (e.g., a client machine, server machine, etc.) configured by an application may constitute a "module" that is configured and operates to perform certain operations as described herein. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

The detailed description has described the principles, embodiments and modes of operation of the present invention. However, the invention should not be construed as being limited to the particular embodiments discussed. The described embodiments should be regarded as illustrative rather than restrictive, and it should be appreciated that variations may be made in those embodiments by those skilled in the art without departing from the scope of the present invention as defined by the claims.

The detailed description set forth herein in connection with the appended drawings is intended as a description of various example embodiments of the present embodiments and is not intended to represent the only embodiments in which the present embodiments may be practiced. The detailed description includes specific details for the purpose of providing a thorough understanding of the present embodiments. However, it will be apparent to those skilled in the art that the present embodiments may be practiced without these specific details. In some instances, well-known structures and components are shown in block diagram form in order to avoid obscuring the concepts of the present embodiments. Acronyms and other descriptive terminology may be used merely for convenience and clarity and are not intended to limit the scope of the embodiments.

The word "example" or "embodiment" is used herein to mean serving as an example, instance, or illustration. Any embodiment described herein as "example" is not necessarily to be construed as preferred or advantageous over other embodiments. Likewise, the term "embodiment" of an apparatus, method or article of manufacture does not use that all embodiments of the embodiments include the described components, structure, features, functionality, processes, advantages, benefits, or modes of operation.

It will be further understood that the terms "comprises" and/or "comprising," when used in this specification, specifically the presence of stated features, steps, operations, elements, and/or components but do not preclude the presence or addition of one or more other features, integers, steps, operations, elements, components, and/or groups thereof. The term "and/or" includes any and all combinations of one or more of the associated listed items.

Unless otherwise defined, all terms (including technical and scientific terms) used herein have the same meaning as commonly understood by a persona having ordinary skill in the art to which this embodiments belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In the detailed description, various aspects of the present embodiments are presented in the context of apparatuses and methods to estimate user gaze. However, as those skilled in the art will appreciate, these aspects may be extended to other similar types of estimations. Accordingly, any reference to an apparatus or method for estimating user gaze is intended only to illustrate the various aspects of the present embodiments, with the understanding that such aspects may have a wide range of applications.

The Abstract of the Disclosure is provided to comply with 37 C.F.R. Section 1.72(b). It is submitted with the understanding that it may not be used to interpret or limit the scope or meaning of the claims. In addition, in the Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the claims reflect, inventive subject matter lies in less than all features of a single disclosed embodiment. Thus the claims are hereby incorporated into the Detailed Description, with each claim standing on its own as a separate embodiment.

The disclosure is directed to systems, methods, and programs for unobstructive multi-view differential gaze estimation and for use in gaze estimation for mid-range and long-range applications. More specifically, the disclosure is directed to systems, methods, and programs for developing a personalized, device independent training process and real-time inference for user's point-of-regard (PoR) estimation based on an individual (intra-person) relative (differential) estimation of eye fixation (minimum number of 1 fixation for a single PoR) based on multiple views of the eye from a single/array of cameras which translates to improvement in the subject's gaze estimation.

Eye tracking and gaze estimation can be used in a wide variety of applications from ophthalmology, assistive technologies for the disabled, through advertising, analysis of human behavior, driver cognition state monitoring, as well as foveated rendering, remote panel-control, eye abbreviation monitoring and correction. In current designs of commercial optical (usually under infrared illumination) gaze-estimation systems, a precise detection of the pupil is mandatory—where pixel error of pupil localization can result in large gaze errors as a function of camera resolution. The information of the pupil center is then combined with glint (also known as the first Purkinje image) localization and the eyeball-center location. These pixel spatial locations are then combined, to produce a geometric calculation of the gaze direction (yaw, pitch). Due to the nature of such calculations, it is prone to large deviations as it has a single-point failure of pixel-level sensitivity.

To obtain the PoR, these types of systems must be first calibrated to a digital display. Secondly, a personalized user calibration must be performed. Usually, a baseline of samples of user fixation, induced by visual stimuli (usually between 3-12 points). The widespread method for calibration is by means of polynomial regression of some degree, as a function of the number of points.

Once the calibration function is determined, it is deterministic across the real-time inference in gaze-tracking. If the system is displaced, the calibration function needs to be re-calculated—causing a loss of the already obtained calibration data.

Gaze-estimation can be divided into two main approaches: appearance-based and model-based—usually obtained by active illumination (infrared) of the eye region. Appearance-based methods are typically based on the assumption that similar eye features (e.g., sclera region, shape of the limbus and iris), correspond to similar gaze directions, from which different mapping functions can be derived to perform gaze estimation, usually by means of regression or a closed-form formula. Conversely, 3D model-based methods perform gaze estimation based on a 3D geometric eye model, which approximates the structure and function of the human vision system up to the model underpinning (e.g., spherical shape of some order with consideration of lens refractive index). Both methods require some step of personal calibration per each of the user's eyes, to provide reasonable accuracy of several degrees of error. Video-based eye-tracking devices also require a physical screen-to-camera calibration every time the setup is constructed. This process requires a human intervention process, and in some cases technical expertise.

There is growing research towards the utilization of deep-neural-networks (DNNs), specifically convolutional-neural-networks (CNNs) in eye-tracking and gaze estimation tasks as a new form of eye appearance/feature-based methods. The motivation is that by an iterative training process (e.g., gradient descent and its extensions), of labeled exemplars of eye-images and ground-truth markings for fixations of the eye on a digital display. With sufficient (un-determined amount) of annotated data the 'deep-model' could ideally determine the classification or regression of eye states and spatial fixation location (on a 2D digital display).

However, the practical reality of both methods (appearance/feature based and model-based) or their combination is that gaze-estimation can be significantly limited due to the quality of the obtained eye-specific features, and their combination for predicting final PoR. This occurs in a wide variety of systems (e.g., stereo vision systems, 3D active sensors, passive imagery setups and the like) and sensitivity to environmental parameters such as light, distance from the sensor, glare reflection (e.g., in spectacles, screens and windows), iris pigmentation, head position and partial eye occlusion (e.g., eye lashes and other obstructions).

Moreover, using current technology, these methods may either: have strong limiting assumptions, heuristic methods to deal with image-based impairments (e.g., missing glint, region-of-interest mean intensity level etc.), are commercially unfeasible, or are insufficiently accurate.

Disclosed, in various exemplary implementations, are systems, methods and programs for the training process of individual user differential gaze estimation and its realization within a real time, unobstructive (passive) PoR detection given a scenario where a person is facing a single digital camera or an array of digital cameras and perform a weighted, learnt, combination of all previously known user fixations (e.g., ground-truth samples) or a combination of thereof to estimate the user PoR using a learning process based on individual physiological considerations of the human eye.

In an exemplary implementation, provided herein is a computerized method for determining a PoR of a user, implemented in a system comprising: in imaging module, a 'Differential Analyzer' module, a display, and a central processing module, the central processing module in communication with the 'Differential Analyzer' module, the imaging module, and the display, and in further communication with at least one processor and a non-volatile memory storage device storing thereon a processor-readable medium with a set of executable instructions, configured, when executed to cause the processor to operate the imaging module, and the display, the method comprising: using the imaging module, obtaining several images of the user (with known fixation location with regards to each other); aggregation of labeled images; detecting at least one of: a face or a head pose; extracting a portion of the frame comprising both eyes of the user for all the frames, thereby extracting an eyes' patch; using the 'Differential Analyzer' module, obtain the user's relative gaze direction with regards to aggregated samples, perform PoR mapping onto a digital display.

In another exemplary implementation, provided herein is a computer readable medium (CRM) comprising software instructions for determining a relative PoR, the instructions being operable, when executed to cause at least one processor included with a computerized system to execute the steps of: using an imaging module included with the computerized system, obtaining at least one reference-fixation-point image of the user; isolating a frame from the image; detecting at least one of: a face or a head pose (6DoF); extracting a portion of the frame comprising both eyes of the user, thereby extracting an eyes' patch; using a 'Differential Analyzer' module included with the computerized system, determining the user's relative PoR and then mapping the PoR in the digital screen coordinate system.

In yet another exemplary implementation, the computerized systems used in conjunction with the methods and programs disclosed herein, further comprise at least one of: an operator interface module, a face and eye detection module, an eyes'-patch normalization unit, and a rendering module.

For a better understanding of systems, methods, and programs for developing real-time, automatic, machine-learning based process of left/right eye relative gaze estimation with regards to reference points collected from the user, or the combination thereof with regard to estimation of point-of-regard (POR). The exemplary implementations thereof, reference is made to the accompanying examples and figures, in which:

FIG. 3 shows the flow chart of general inference flow for differential gaze estimation, and its conversion to PoR. FIG. 4 is a detailed inference flow, describing the flow from digital image to PoR. FIG. 8 is a schematic of an exemplary implementation of a system layout.

Figure 10:
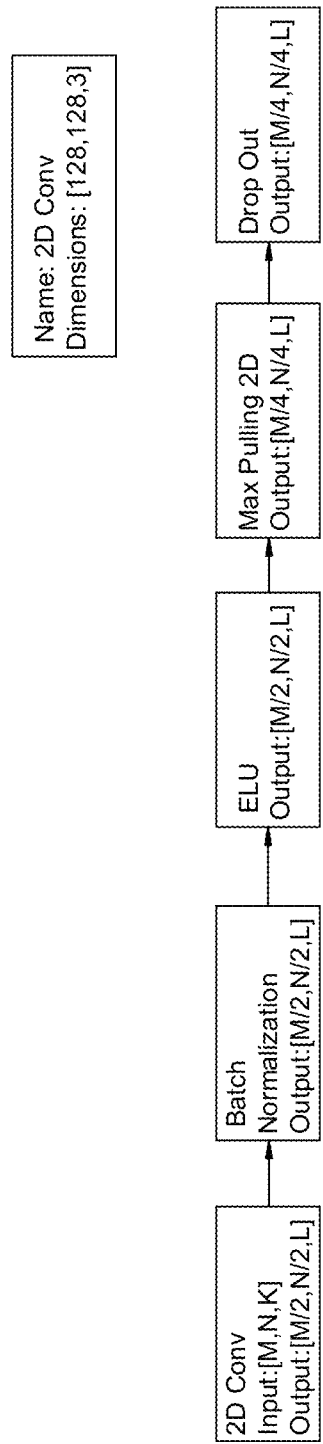
FIG. 10 shows a Vanilla network micro-block.

A Vanilla network micro-block is shown in FIG. 10.

Figure 11:
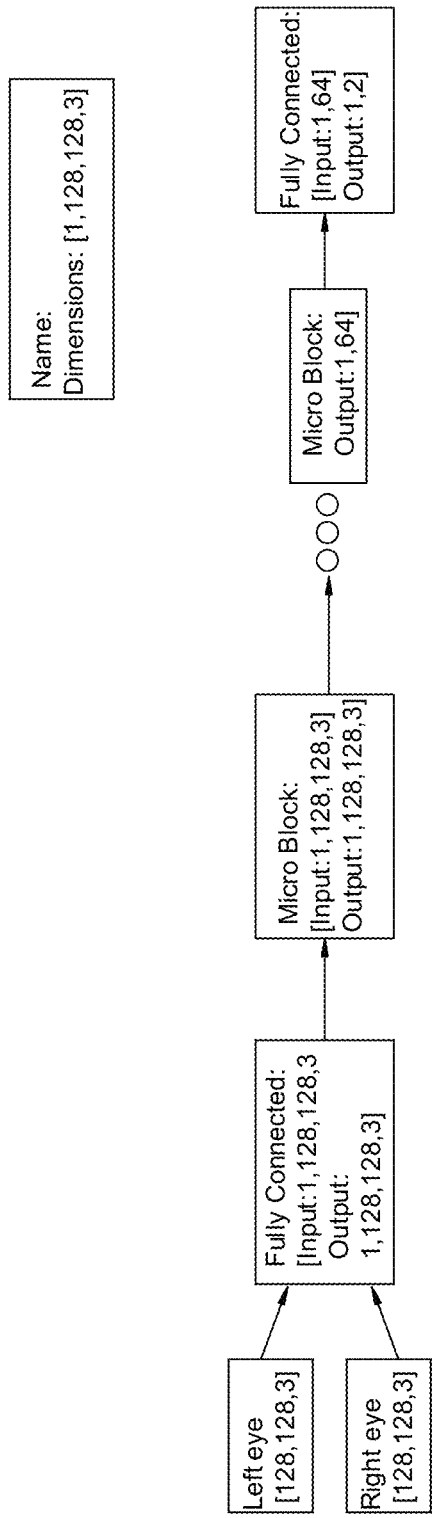
FIG. 11 shows a Vanilla network Architecture.

A Vanilla network Architecture is shown in FIG. 11.

Figure 12:
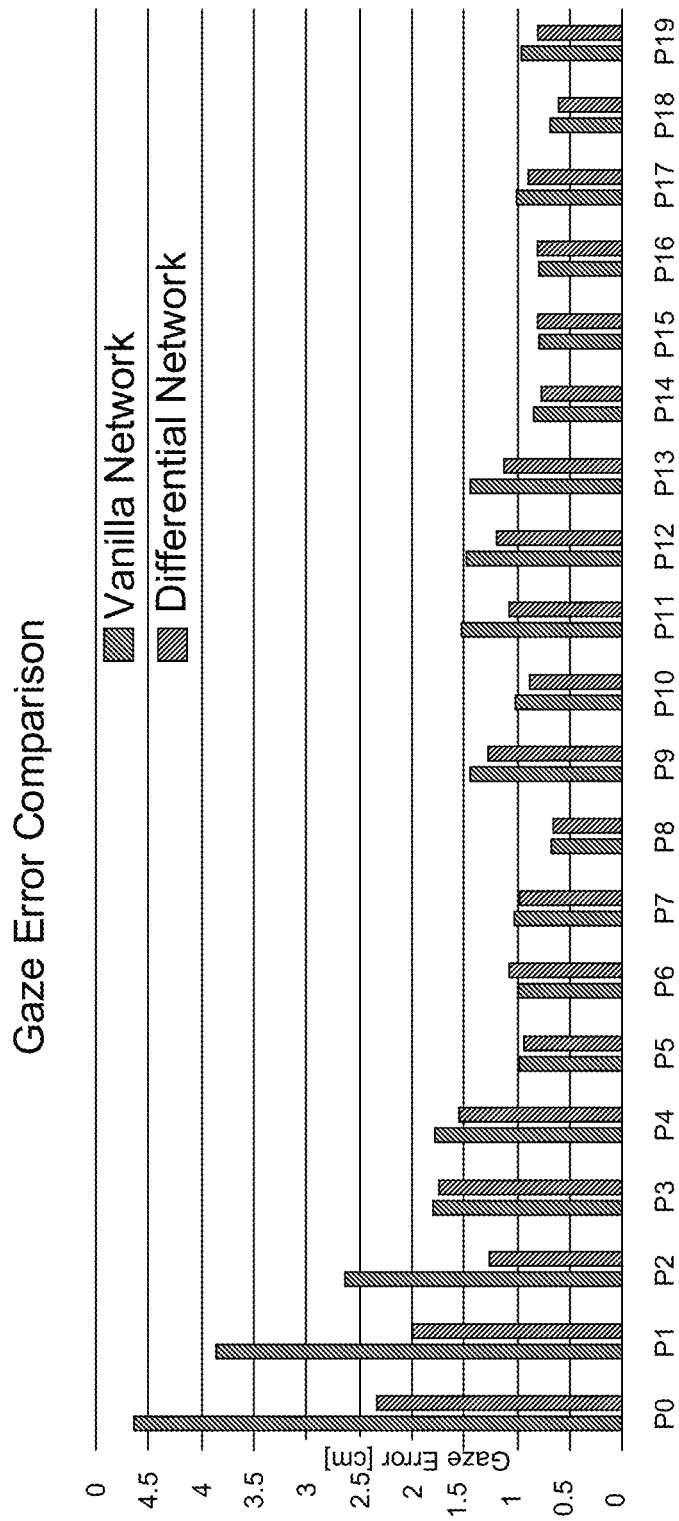
FIG. 12 is a gaze error comparison graph illustrating the comparison of results with regards to baseline method results for gaze estimation using a deep-learning schema.

FIG. 12 is a gaze error comparison graph illustrating the comparison of results with regards to baseline method results for gaze estimation using a deep-learning schema.

Figure 13:
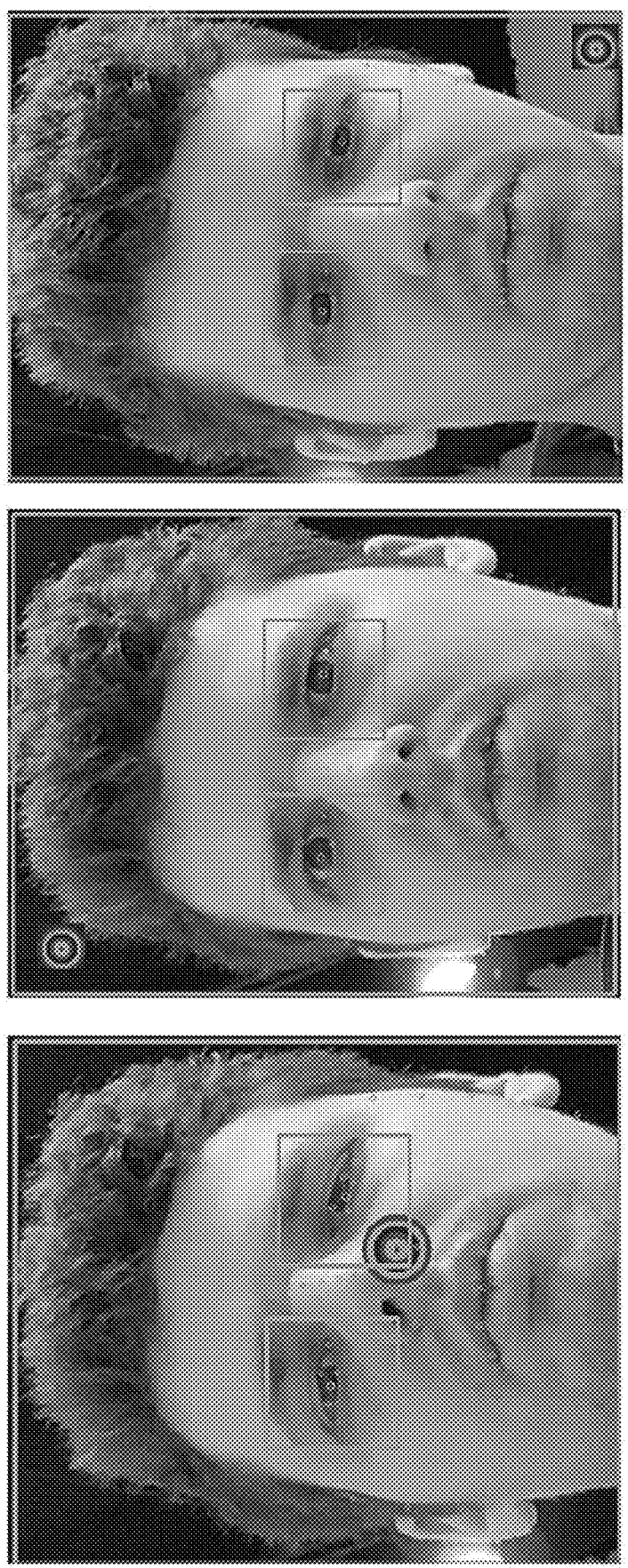
FIG. 13 illustrates feature extraction used as a function of change in location of known PoR fixation points.

FIG. 13 illustrates feature extraction used as a function of change in location of known PoR fixation points. Eye patches are illustrated.

Provided herein are exemplary implementations of systems, methods, and programs for developing an appearance-based, deep-neural-network (DNN) framework for estimation of the user's point-of-regard (PoR) through differential gaze analysis (estimation of the relative PoR) using multiple instances of the user's fixation (with at least one fixation for a known spatial location on the digital display) for real-time PoR estimation without having to undergo system and/or user calibration.

The provided systems, methods and programs are adapted, when implemented, to provide an estimate of the user's PoR by analysis of the user's face and eye images through a process of intra-user differential training and inference, using a small number of gaze fixation exemplars (at least one fixation point) from the specific user, and their combination at real-time inference. Therefore, the user does not have to calibrate the system (e.g., camera-screen position), or adjust camera position after the system is turned on. It allows the user to drastically change his position with regards to the camera or alter the environmental settings (e.g., lighting, distance) in the real-time inference flow.

The provided systems, methods and programs are adapted, when implemented, to provide an optimal combination differentiating the user's personalized eye properties, which are not visible in the digital image (e.g., eye dominance, Amblyopia, lens prescription, etc.), solely based on the image of the face, both eyes, and their differential relation. In the context of the disclosure, the term "differential relation" refers to the user-specific differential in each eye's gaze point assuming a known common fixation point (interchangeable with "focal point" and "focus point") to both eyes at a fixed 6 DoF head pose.

Therefore, because the gaze estimation system does not have to use a user specific calibration process, the disclosed systems, methods, and programs (processor-readable media, e.g.) can be extremely beneficial for user experience in both mid-range (laptop, tablet, mobile-device) and long-range (TV display, billboard, point-of-sale). The continuous and automatic determination of the user's PoR is essential in eye panel control, e.g., operation of an elevator panel for remote floor selection.

Included in the term "mid-range" refers to cases when the reference camera is situated between 30-90 cm from the user's eyes. Included in the term "long-range" refers to cases when the reference camera is situated between 100-300 cm from the user's eyes. In both cases there is usually a digital display that projects content which is consumed by the user and can be touchlessly manipulated by him, using eye gestures (e.g., fixation through dwell-time, blinks, winks etc.).

In general, gaze estimation methods can be categorized as either model/feature-based or appearance-based. Model/feature-based methods extract eye features such as low-level human generated feature detectors e.g., eye contour, eye-corners, pupil size, pupil center and corneal reflections (referred to as glint(s)). Most methods require active light sources outside of the human vision spectrum (e.g., infra-red), and can achieve relatively high accuracy subject to calibration. However, accurate and robust feature extraction requires specialized equipment such as infrared light source(s) to provide a strong contrast and high image quality to enable the extraction of these features. In many cases, this is not achievable due to the user's position with regards to the active light-source or camera, refraction from glasses or other surfaces, and large distance. These approaches explicitly estimate gaze features, such as eye geometric features, intrinsic camera calibration parameters and a single-time personal calibration process and provide the absolute prediction of PoR with regards to the digital display, subject to system (camera-screen) and user-specific calibration. These are highly affected by the location of the camera, the user's head-pose and the individual eye properties that are not visible in a digital image.

Provided herein, in an exemplary implementation, is a supervised training process to assess and determine in real-time, for each user visible to the camera, the relative gaze displacement which is used to provide a real-time PoR prediction. The method does not require any special devices, nor human crafted low-level features (e.g., pupil fitting). The systems implementing the methods disclosed are trained, in a supervised, differential manner to select the optimal eye fixation combination between the reference fixation points and the target PoR to be estimated from the user, under real world conditions that optimizes the accuracy and precision in PoR mapping. This includes the implicit (reflected in the data—collected under real-world conditions) consideration of limited features detection caused by image quality and resolution, variance of lighting condition, head pose, and user variability in terms of internal eye structure (e.g., leading eye).

An exemplary implementation of a pseudocode for Supervised Differential Analyzer Training is provided herein below: Supervised Differential Analyzer Training 1. For Each image in M_K_DATA_CLEAN
   a. For each set of images in (size of batch: between 50-150 image pairs):
   b. Create combinatorial vector of Primary-Target (for which the PoR is estimated) and Reference set for training the Differential Unit.
   c. For number of EP(=150-250) epochs:
   i. For each Batch
   1. For each left and right image pair train convolutional-neural-network (CNN) followed by the 'Differential Analyzer Unit'
   a. CNN Network:
   i. 8-12 CNN 'micro-layers' of the following sequential form:
   1. 2D-Convolution.
   2. Batch-Normalization.
   3. Exponential Linear Unit: ELU(x)={x if x>0 else a(exp (x)−1)}.
   4. Dropout.
   ii. The output of (i) is 128-256 sized feature vector.
   b. Define 'Parametric Transform Block':
   i. Batch-Normalization.
   ii. Activation Function (e.g. ReLu, Sigmoid, Tanh)
   iii. Dropout layer.
   iv. Dense Layer (fully connected NN).
   c. 'Differential Analyzer Unit'( ).
   d. Calculation of contrastive gaze loss function:
   i. Relative error of Primary sample to Reference Set $L_{Differential}$(e.g. Mean-Square-Loss or any other.).
   ii. Absolute Loss function between the Primary sample and ground-truth-$L_{Absolute}$(e.g. Mean-Square-Loss, or any other). Update network weights using backpropagation optimization (e.g., ADAM, SGD etc.)

Given a set of images of the user's face and eyes with a known (reference) fixation point on a digital display (e.g., ($X_{screen}$, $Y_{screen}$) in the display coordinate system as given in FIG. 8), the systems, methods, and programs provided herein perform a learned, weighted combination between the user's eyes information taken from different eye fixation (termed reference points) locations and combines them to estimate PoR prediction for the target image, for every frame captured by the digital camera for the particular user. The supervised training approach is built upon the constraints of minimization of gaze error for the specific user, which is implemented through, for example, a contrastive differential loss-function, optimized through the training processes using backpropagation algorithms (e.g., stochastic gradient descent). The systems, methods, and programs provided allow for relative PoR estimation to be found, using a seamless adaptation process, which captures the intra-user eye behavior. The differential estimation is not limited to several user calibration points and can utilize an infinite amount of recorded fixation points to improve the user's PoR prediction under changing environmental conditions, constraining the fact that the internal eye parameters remain the same for this specific user.

An example of the pseudo code used in the differential analyzer is provided below.

Differential Analyzer Module:
1. Input:
 a. Left/Right Target Eye Patch {[128,128,3]-[256,256,3]]}
 b. Target head-pose ([6,1])
 c. Left/Right Reference Eye Patch Vector N{1-9} X [128,128,3]-[256,256,3]]
 d. Reference head-pose Vector N{1-9} X ([6,1])
2. Eye Combinations Block (ECB):
 a. Apply 'micro-layers' feature extraction on all inputs (a-d):
  i. Output: [64-256] Feature vector for each Reference input vector.
  ii. Output: [64-256] Feature vector the target input.
 b. Apply Feature-Extraction on (i) and (ii):
  i. Concatenate all Feature-Vectors for Reference inputs: N X [64-256]
  ii. Fully-Connected-Layer.
  iii. Batch-Normalization.
  iv. Exponential Linear Unit: ELU(x)={x if x>0 else a(exp(x)−1)}
 c. Apply concatenation on the result from 2b. Output vector-[1×256]
 d. Apply Fully-Connected-Layer on 2c: output: [1,64].
3. Head-pose Combinations block (HCB):
 a. Apply Fully-Connected-Layer on:
  i. Target head-pose ([6,1]).
  ii. Reference head-pose (N×[6,1]).
 b. Concatenate all Feature-Vectors for Reference inputs: N×[1,6]
 c. Apply Fully-Connected-Layer on 3b.
 d. Concatenate 3c with 3a(i).
 e. Apply Fully-Connected-Layer on 3d. Output: [1,6]
4. Concatenate 3e with 2d: Output: [1,70].
5. Apply Feature-Extraction on (4):
 a. Fully-Connected-Layer.
 b. Batch-Normalization.
 c. Exponential Linear Unit: ELU(x)={x if x>0 else α(exp(x)−1)}
 d. Output: [1,64]

The results of the Differential Network inference are illustrated above, compared to a conventional (direct PoR mapping) CNN inference, termed the 'Vanilla Network' measured in cm with respect to a known ground-truth point on a digital display.

While there is abundant literature about user absolute gaze estimation using a single image instance, there is little if any research about end-to-end embedding of known physiological and physical deficiencies using data driven methods (when the ophthalmological deficiency is not known but rather inferred from the data itself) from multi-viewing inputs to determine the relative user specific PoR mapping. Most of the known methods use heuristic methods to compensate for user specific eye characteristics in performing gaze inference. Conversely, provided herein is a framework that implicitly determines the relation between each eye position of the user in a relative, rather than in an absolute fashion, when it comes to gaze inference (in other words, in determining PoR), including salient features (e.g., ocular dominance) that are not visible within a digital frame and cannot be externally labeled by a human due to large variance in camera types, intrinsic camera characteristics, position with regards to a user's eyes and the digital display.

The concept of a data driven 'Differential Analysis module' (DAM) can be extended beyond the Gaze Inference task. This technique allows for an end-to-end training of the DAM with domain-expertise knowledge embedded into the network training process through differential analysis of the same phenomenon captured at different instances-either time, view-points, spectral intensity levels or spatial differences for each eye (left and right, e.g.) of the user. The 'differential embedding' is performed implicitly, through a supervised training and learning process that optimizes the final objective function, given through a contrastive loss function, which can be altered by the system as a function of the task at hand.

Although the system uses a contrastive loss function in one exemplary implementation, other machine learning algorithms can be used, such as for example, triplet neural networks and modified Siamese neural networks.

Accordingly and in an exemplary implementation illustrated herein is a computerized deep-learning method of establishing the user's relative PoR, implementable in a system comprising an imaging module facing the user, a central processing module (CPM) in communication with a user interface module, a face and eye detection module, eye-patch extraction module, rendering module, and a digital display used for user interaction and/or activation, the method comprising: using the imaging module, capturing single or multiple images of the user's eye(s); for each image, extracting the user's head and both eyes; using an imaging database in communication with the system, training the system prior to inference flow. The method further comprising: capturing a user fixation labeled image comprising the eye region; each (Xscreen, Yscreen) coordinate of the user fixation on the screen is known and used as the ground-truth for the training phase, however the absolute gaze fixation with regards to imaging is yet unknown and not needed for this process. A plurality of convolutional filters on the image comprising the eye region to recover the differential (left and right) eye position for every target frame independently, based on a reference set of known fixation points.

Depending on camera sensor, the output of camera reader could be 2010:
 n×m×1=if Grayscale
 n×m×3=ifRGB The output of face detector is a list of structured face objects 2030 including at least the following fields:

Crop of the face
Bounding box of the face with respect to frame
Head-pose (6-DoF).
Generation of training sets:
For each user ID sort, the image-PoR pairs based on increasing distance from each other.
Generate training input (single image) and Reference (K={1-9} images) for all combinatorial combination $$\left(\binom{1}{k-1}\right).$$

Eye Patch Extractor:
Eye landmarks 2040
Bounding boxes for both eyes with respect to frame (128×128 up to 512×512)
Head-poser estimation.
Eye-patch descriptor (EPD):
General Eye Patch Image Features: 128 features for each eye based on a CNN.
Differential Eye patch Features: 128 features for each combination of the differential-set based on a CNN.
Differential Analyzer Module:
Aggregation of all relative-feature-vectors (RFV) for all reference points
Non-linear combination of RFV into single relative feature space (RFS).
Raw Gaze Predictor (RGP) 207:
Output 2070 is based on Regression (fully connected (FC) layers) applied on EPD:
(a). Point-of-regard (PoR) regression.
(b). Differential regression—relative location from reference point
Fusion of (a)+(b) and mapping to 2D PoR on the digital screen.
Output 2080 of corrected gaze estimator is a PoR and Region selection for each detected face.

In the exemplary implementation of the method provided, mapping the PoR can comprise: training at least one 'Vanilla' Convolutional-Neural-Network (CNN) based on a set of a plurality of reference fixation points and target point combinatorial eye images sets; using at least one of the imaging module, the face detection module, and the eye region cropping module each included in the systems used to implement the methods disclosed, identifying an image of the eye(s) for the CNN; and for each of the eye images, extracting spatial features corresponding to each eye separately.

An exemplary pseudocode for preparation of the dataset for training is provided below.

Pseudo Code I: Dataset Preparation for Training
1. For each of the K ({1-9}) reference fixation points:
2. Obtain M images that include human face and two (left/right) eyes and their corresponding fixations (X, Y) on the screen, collected thought standard image-based stimuli:
  a. Detection of face and eyes in the image (bounding box for eyes and face).
  b. Calculation of head-pose (6DoF) for each image (face and eyes pair).
  c. Filter out images that do not have visible eyes in the frame:
    i. Remove images where eye Blink's are detected.
    ii. Remove images that do not have minimal pixels (above 20 pixels).
  d. Find eye-center and create eye crop with eye patches within the range of (96×48, 192×96, 384×192).
  e. Generation of aggregated sets: Primary sample and Reference samples (1-9).
  f. Output of clean dataset that will be used for supervised training (M_K_DATA_CLEAN)
3. Generate A TRAINNALIDATION/TEST set with 60%, 30% and 10% proportion respectively:
  a. The ground-truth is
    i. The relative (X, Y) location in mm between primary sample and Reference set.
    ii. The absolute (X, Y) location in mm in camera coordinate system.
    iii. Combinatorial generation of Primary and sample and reference points $$\binom{1}{k-1}.$$

The CNN can be any type or form of convolutional number of layers (between 10-30) depending on the image resolution and number of channels. This 'Vanilla' model may produce a predetermined number of features (between 64-512) from the captured image data via a training process, with standard optimization techniques (e.g., stochastic gradient descent). For example, the term "Vanilla" may refer to a CNN with an architecture given for example, in figures shown herein.

An error comparison (in centimeters, cm.), between calculated PoR and actual fixation point coordinates on the digital screen, using "vanilla" CNN and the differential CNN, as a function of participant ID, is an exemplary implementation. As demonstrated, baseline gaze estimation method was done using a 'Vanilla Network'. This baseline estimation takes both eye-patches covering between about 128×128 and about 512×512 pixels as input and outputs the (X, Y) PoR on the digital screen in cm/pixels, which is compared to ground data collected for the participants. The ADAM optimizer (referring to adaptive moment estimation of first and second moments of a given gradient to adapt the learning rate for each weight of the neural network) was used, with an initial learning rate of 0.0001- of 0.0005, and the batch size is set to be 50. We trained the baseline model for 25 epochs and decay the learning rate by a factor of 0.1-0.3 every 10-30 epochs. The 'Differential Network' in this evaluation, used a single reference point, these results can be further improved with more anchor points collected from the user during a calibration phase.

Turning now to the 3 face images shown herein, a Visual example of eye-patches extracted from the reference-point (fixation on a known spatial location of a PoR and target may be predicted using the Differential-Network inference block. Also show examples of features extracted in steps and general extracted features extracted in step using the aggregator module included with the system, yielding output.

It is noted that the term "imaging module" as used herein means a head mounted device module that includes a plurality of built-in image and/or optic sensors and outputs electrical signals, which have been obtained through photoelectric conversion, as an image, while the term "module" refers to software, hardware, for example, a processor, or a combination thereof that is programmed with instructions for carrying an algorithm or method. The modules described herein may communicate through a wired connection, for example, a hard-wired connection, a local area network, or the modules may communicate wirelessly. The imaging module may comprise charge-coupled devices (CCDs), a complimentary metal-oxide semiconductor (CMOS) or a combination comprising one or more of the foregoing. If static images are required, the imaging module can comprise a digital frame camera, where the field of view (FOV) can be predetermined by, for example, the camera size and the distance from the subject's face. The camera used in the imaging modules of the systems and methods disclosed, may be a digital camera. The term "digital camera" refers in an embodiment to a digital still camera, a digital video recorder that can capture a still image of an object and the like. The digital camera can comprise an image capturing module or module, a capture controlling module, a processing module (which can be the same or separate from the central processing module).

Capturing the image can be done with, for example image capturing means such as a CCD solid-state image-capturing device of the full-frame transfer type, and/or a CMOS-type solid-state image capturing device, or their combination. Furthermore, and in another embodiment, imaging module can have a single optical (e.g., passive) sensor having known distortion and intrinsic properties, obtained for example, through a process of calibration. These distortion and intrinsic properties are, for example, modulation-transfer function (MTF), pinhole camera model attributes such as: principal point location, focal-length for both axes, pixel-size and pixel fill factor (fraction of the optic sensor's pixel area that collects light that can be converted to current), lens distortion coefficients (e.g., pincushion distortion, barrel distortion), sensor distortion (e.g., pixel-to-pixel on the chip), anisotropic modulation transfer functions, space-variant impulse response(s) due to discrete sensor elements and insufficient optical low-pass filtering, horizontal line jitter and scaling factors due to mismatch of sensor-shift- and analog-to-digital-conversion-clock (e.g., digitizer sampling), noise, and their combination. In an embodiment, determining these distortion and intrinsic properties is used to establish an accurate sensor model, which can be used for any calibration algorithm to be implemented.

To facilitate some operations of the methods and programs described, the system can further comprise a graphic processing module (GPM), in communication with the central processing module and the processor. It should be understood though, that the graphics processing module may or may not be a separate integrated circuit.

The systems used herein are a computerized system; further comprising a central processing module; a display module; and a user interface module. Display modules, which can include display elements, may include any type of element, which acts as a display. A typical example is a Liquid Crystal Display (LCD). LCD for example, includes a transparent electrode plate arranged on each side of a liquid crystal. There are, however, many other forms of displays, for example OLED displays and Bi-stable displays. New display technologies are also being developed constantly. Therefore, the term display should be interpreted widely and should not be associated with a single display technology. Also, the display module may be mounted on a printed circuit board (PCB) of an electronic device, arranged within a protective housing and the display module is protected from damage by a glass or plastic plate arranged over the display element and attached to the housing.

Additionally, "user interface module" broadly refers to any visual, graphical, tactile, audible, sensory, or other means of providing information to and/or receiving information from a user or other entity. For example, a set of instructions, which enable presenting a graphical user interface (GUI) on a display module to a user for displaying and changing and or inputting data associated with a data object in data fields. In an embodiment, the user interface module can display any data that it reads from the imaging module.

As indicated, the systems implementing the methods provided, using the programs provided can further comprise a central processing module; a display module; an edge detection module, and a user interface module. The term 'module', as used herein, means, but is not limited to, a software or hardware component, such as a Field Programmable Gate-Array (FPGA) or Application-Specific Integrated Circuit (ASIC), which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

As indicated, provided herein is a computer program, comprising program code means for carrying out the steps of the methods described herein, as well as a computer program product (e.g., a micro-controller) comprising program code means stored on a medium that can be read by a computer, such as a hard disk, CD-ROM, DVD, USB memory stick, or a storage medium that can be accessed via a data network, such as the Internet or Intranet, when the computer program product is loaded in the main memory of a computer [or micro-controller] and is carried out by the computer [or micro controller].

Furthermore, provided herein is a computer-readable medium comprising the executable instructions disclosed. Accordingly, provided herein is processor-readable media implementable in the computerized systems described herein, whereby the central processing module further comprising a non-volatile memory having thereon the processor readable media with a set of instructions configured, when executed to cause the central processing module to: user facing digital-camera, capture a plurality of images of the user's face and eye; for each image, a set of features are calculated per-eye using standard convolutional layers (e.g. Vanilla Network), which is later processed by the 'eye selector' module, proving the dominant eye soft-selection (in the form of a probability term per each eye combination), wherein the eye-tracking module comprises: an imaging module; a face and eye detecting module; and a rendering module.

The term "computer-readable medium" as used herein, in addition to having its ordinary meaning, refers to any medium that participates in providing instructions to a processor for execution. Such a medium may take many forms, including but not limited to, non-volatile media and volatile media. Non-volatile media can be, for example, optical or magnetic disks, such as a storage device. Volatile media includes dynamic memory, such as main memory.

Memory device as used in the methods, programs and systems described herein can be any of various types of memory devices or storage devices. The term "memory device" is intended to encompass an installation medium, e.g., a CD-ROM, floppy disks, or tape device; a computer system memory or random-access memory such as DRAM, DDR RAM, SRAM, EDO RAM, Rambus RAM, etc.; or a non-volatile memory such as a magnetic media, e.g., a hard drive, optical storage, or ROM, EPROM, FLASH, etc. The memory device may comprise other types of memory as well, or combinations thereof. In addition, the memory medium may be located in a first computer in which the programs are executed (e.g., a training computer), and/or may be located in a second different computer [or micro controller] which connects to the first computer over a network, such as the Internet and might be even not connected and information will be transferred using USB drive. In the latter instance, the second computer may further provide program instructions to the first computer for execution.

The term "memory device" can also include two or more memory devices, which may reside in different locations, e.g., in different computers that are connected over a network.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

The terms "a", "an" and "the" herein do not denote a limitation of quantity and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the stack(s) includes one or more stack). Reference throughout the specification to "one embodiment", "another embodiment", "an embodiment", and so forth, when present, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Although the foregoing disclosure for systems, methods and programs for developing a personalized, device independent training process and real-time inference for user's point-of-regard (PoR) estimation based on an individual (intra-person) relative (differential) estimation of eye fixation has been described in terms of some embodiments, other embodiments will be apparent to those of ordinary skill in the art from the disclosure herein. Moreover, the described embodiments have been presented by way of example only and are not intended to limit the scope of the embodiments. Indeed, the novel methods, programs, and systems described herein may be embodied in a variety of other forms without departing from the spirit thereof. Accordingly, other combinations, omissions, substitutions, and modifications will be apparent to the skilled artisan in view of the disclosure herein.

While the invention has been described in detail and with reference to specific embodiments thereof, it will be apparent to one of ordinary skill in the art that various changes and modifications can be made therein without departing from the spirit and scope thereof.

A computerized method for determining a point of regard (PoR) of a user, implemented in a system comprising: an imaging module, a 'Differential Analyzer' module, a display, and a central processing module (CPM), the CPM in communication with the 'Differential Analyzer' module, the imaging module, and the display, and in further communication with at least one processor and a non-volatile memory storage device storing thereon a processor-readable medium with a set of executable instruction, configured, when executed to cause the processor to operate the imaging module, and the display, the method comprising: using the imaging module, automatically capturing and labeling a plurality of user images, each user images providing a frame; aggregating labeled images; detecting at least one of: a face, and a head pose; extracting a frame portion comprising both eyes of the user for all the frames, thereby extracting a user's eyes' patch; using the 'Differential Analyzer' module (DAM), obtaining the user's relative gaze direction with regard to the aggregated samples from each eye patch; and mapping the user PoR onto the digital display. The method wherein each captured user image has a known reference fixation point with regard to each eye. The method wherein the step of obtaining the user's relative gaze direction with regard to the aggregated samples from each eye patch further comprises using machine learning: iteratively determining the combination of eye fixation points for both eyes for each labeled eye patch; and selecting the optimal eye fixation combination between the reference fixation points and the target PoR. The method wherein the digital display is operable to provide coordinates for each PoR. The method wherein the step of selecting the optimal eye fixation combination between the reference fixation points and the target PoR comprises: minimizing the error between the combination eye fixation reference points and the target PoR for the specific user. The method wherein minimizing the error is implemented using a contrastive differential loss-function. The method wherein the step of mapping the user PoR onto the digital display is preceded by a step of generating a raw gaze prediction for each captured image. The method wherein the step of generating raw gaze prediction further comprises: detecting a face of the user; cropping eye-patches from the identified face; and determining head-pose of the user; generating raw gaze inference on the display screen; classifying the eye-state of the user; collecting a predetermined number of fixation points on the display screen; clustering the predetermined number of fixation points; and determining the raw gaze point for each eye; training at least one Convolutional-Neural-Network (CNN) based on a set of the combination of the plurality of the references fixation points and target point; using at least one of: the imaging module, a face detection module, and an eye region cropping module, both included in the system, identifying an image of each eye of the user for the CNN; and for each of the eye images, extracting a spatial-features corresponding to each eye separately. The method wherein the system further comprises: an eye-tracking module. The method wherein for each captured image the method further comprises: using the eye-tracking module, extracting a set of features per-eye using a plurality of convolutional layers. The method wherein the eye-tracking module comprises: an imaging module; a face and eye detecting module; and a rendering module.

An article of manufacture (AoM) for developing a personalized, device independent training process and real-time inference for user's point-of-regard (PoR) estimation based on a differential intra-person estimation of eye fixation points, comprising a computer-readable media with set of executable instructions, configured, when executed, to cause at least one processor to: using an imaging module included with the AoM, automatically capture and label a plurality of user images, each user images operable to provide a frame;

aggregate the plurality of labeled images; in each image, detect at least one of: a face, and a head pose; extract a frame portion comprising both eyes of the user for all the frames, and isolating a user's eyes' patch; using a 'Differential Analyzer' module (DAM) included in the AoM, obtain the user's relative gaze direction for each eye with regard to the aggregated samples from each eye patch; and map the user PoR onto the digital display. The AoM wherein each captured user image has an associated reference fixation point provided by a set of coordinates on a digital display included with the AoM, with regard to each eye. The AoM wherein, to obtain the user's relative gaze direction, the set of executable instructions is further configured to use machine learning for: iteratively determine the combination of eye fixation points for both eyes for each labeled eye patch; select the optimal eye fixation combination between the reference fixation points and the target PoR; and generate a user-specific calibration function. The AoM wherein to map the user PoR onto the digital display the set of executable instructions is first configured to generate a raw gaze prediction for each captured image. The AoM wherein to generate raw gaze prediction the set of executable instructions is further configured to, for each captured frame: detect a face of the user; crop eye-patch from the identified face; and determine head-pose of the user; generate raw gaze inference on the display screen; classify the eye-state of the user; collect a predetermined number of known fixation points on the display screen cluster the predetermined number of known fixation points; and based on cluster, determine the raw gaze point for each eye.

A method of gaze estimation using relative feature vectors, the method comprising: receiving user image data; estimating user head pose based on the user image data; extracting a plurality of eye patch image features based on the user image data; aggregating a plurality of relative feature vectors based on the plurality of eye patch image features; performing a non-linear combination of relative feature vectors into a single relative feature space; performing a differential regression on the relative feature vectors to give a relative location from a reference point and a point of regard; and mapping the point of regard to a 2D display.

The disclosure relates to systems, methods, and programs for implicitly determining the user's point-of-regard (PoR), and its relative (with respect to a known reference point) location based on a combination or pair of differential in previous fixation observations of the user's eyes, achieved through an end-to-end learning methodology schema combining the calibration and PoR training process into a single process that overcomes the inherent differences between individuals' eyes through a differential training process, identifying the spatial and silent features related to the specific user. This system allows for multiple reference inputs (with at least one reference point), of past fixations (at least one), to be used for real-time PoR inference which results in improved gaze-prediction and can be scaled to a large number of differential viewing points when the system is used in continuous manner (e.g., video streaming) or scaled to multiple camera setups (e.g., long-range gaze estimation).

The invention claimed is:

1. A method to determine a target point of regard associated with a user of a display, the method comprising:
receiving a target image data associated with the user from a camera coupled with the display, wherein the target image data includes a target eye patch image data associated with the user and target head region image data;
determining, using a convolutional neural network, the target point of regard associated with the target image data based on:
the target eye patch image data,
a plurality of aggregated gaze reference vectors, and
a plurality of reference image data associated with the user, the plurality of reference image data respectively associated with the plurality of aggregated gaze reference vectors, one or more of the plurality of reference image data each including reference head region image data;
determining a target 6D head position associated with the target head region image data;
determining a reference 6D head position associated with the reference head region image data;
determining a target 3D eye position associated with the target eye patch image data;
wherein the target point of regard is determined within a predetermined threshold; and
mapping the target point of regard onto the display.

2. The method of claim 1 determining the target point of regard further comprises:
associating a weighting factor with one or more reference image data of the plurality of reference image data based on a probability of a match between the target eye patch image data and the one or more reference image data, and
using the weighting factor of the one or more reference image data to determine the target point of regard within the predetermined threshold.

3. The method of claim 2 further comprising updating the convolutional neural network with the target point of regard, and the associated target image data.

4. The method of claim 3 further comprising calculating a contrastive gaze loss function to determine a gaze error associated with the target point of regard.

5. The method of claim 4 further comprising updating the weighting factors using a back-propagation calculation, wherein the back-propagation calculation includes one or more of a stochastic gradient descent algorithm and/or an adaptive moment estimation algorithm.

6. The method of claim 1 wherein the camera is configured to be a minimum distance of 30 cm to 300 cm from the user.

7. The method of claim 1 wherein the mapping the target point of regard onto the display further comprises mapping to one of rendered content on the display, 2D coordinates associated with the display, 3D coordinates associated with the display, and/or pixels associated with the display.

8. The method of claim 7 further comprising:
selecting the region of interest via an eye gesture associated with the user, and
converting the selected region of interest and the associated eye gesture to computer-readable data to execute a command in an operating system associated with the display.

9. The method of claim 7 wherein a region of interest associated with the target point of regard is associated with one or more of the following for the display:
a single point,
text,
a single pixel,
a cursor position,
a 3D graphical rendering,
a 2D graphical rendering,
a range of text,
a word, a 2D area, and/or a 3D area.

10. The method of claim 1 wherein the target point of regard refers to a particular moment in time for rendered content that changes over time, wherein the rendered content includes one or more of text content and/or image content displayed within the display.

11. The method of claim 1 wherein the target point of regard is determined based on one or more of the following:

rendered content for the display, content focus, and/or content selection.

12. The method of claim 11 further comprising:

receiving the content focus and the content selection through an input module for an operating system, wherein the content focus and the content selection are associated with one or more eye gestures at the target point of regard.

13. The method of claim 1 further comprising:

determining a first blink associated with the target eye patch image data of the user, and a second blink associated with the target eye patch image data of the user, determining a time difference between one or more of the following: a beginning of the first blink and a beginning of the second blink, an end time of the first blink and an end time of the second blink, and/or a first time during the first blink and a first time during the second blink, and determining a blink rate using the time difference.

14. The method of claim 1 wherein the plurality of aggregated gaze reference vectors, associated with the plurality of reference image data, respectively, is determined using one or more of the following:

(a) receiving a first head image data having a first eye position and a first head position in response to rendered content displayed in the display at a reference point of regard in the display, using: (1) the first eye position, (2) the first head position, (3) the reference point of regard in the display, and (4) weighted reference image data, to determine a first gaze reference vector associated with first head image data, and updating the plurality of aggregated gaze reference vectors with the first gaze reference vector, (b) updating the plurality of aggregated gaze reference vectors with the target point of regard associated with the target image data, and/or (c) receiving a first head image data having a first eye position and a first head position, a second head image data having a second eye position and a second head position, and a third head image data having a third eye position and a third head position, and determining an estimated gaze vector associated with the third eye position based on the first head image data and the second head image data.

15. The method of claim 1 further comprising:

using the convolutional neural network to estimate a future point of regard associated with the user on a 3D display.

16. The method of claim 1 further comprising:

receiving the target eye patch image data associated with the user to determine one or more of eye characteristics, eye position, and gaze position.

17. The method of claim 16 wherein receiving includes receiving, from an infrared light source through a camera lens, light in a frequency range of about 4000 cm$^{-1}$ to about 12,500 cm$^{-1}$ and receiving, from a visible light source through the camera lens, light in a frequency range of about 12,500 cm$^{-1}$ to about 26,300 cm$^{-1}$.

18. A method to determine a target point of regard associated with a user of a display, the method comprising:

receiving a target image data associated with the user from a camera coupled with the display, wherein the target image data includes a target eye patch image data associated with the user;

determining, using a convolutional neural network, the target point of regard associated with the target image data based on:

the target eye patch image data, a plurality of aggregated gaze reference vectors, and a plurality of reference image data associated with the user, the plurality of reference image data respectively associated with the plurality of aggregated gaze reference vectors, wherein the target point of regard is determined within a predetermined threshold; and mapping the target point of regard onto the display by mapping to one of rendered content on the display, 2D coordinates associated with the display, 3D coordinates associated with the display, and/or pixels associated with the display;

wherein a region of interest associated with the target point of regard is associated with one or more of the following for the display:

a single point, text, a single pixel, a cursor position, a 3D graphical rendering, a 2D graphical rendering, a range of text, a word, a 2D area, and/or a 3D area; and wherein dimensions associated with the target point of regard exceed spatial dimensions of the display.

19. A method to determine a target point of regard associated with a user of a display, the method comprising:

receiving a target image data associated with the user from a camera coupled with the display, wherein the target image data includes a target eye patch image data associated with the user;

determining, using a convolutional neural network, the target point of regard associated with the target image data based on:

the target eye patch image data, a plurality of aggregated gaze reference vectors, and a plurality of reference image data associated with the user, the plurality of reference image data respectively associated with the plurality of aggregated gaze reference vectors, wherein the target point of regard is determined within a predetermined threshold;

mapping the target point of regard onto the display;

determining a first blink associated with the target eye patch image data of the user, and a second blink associated with the target eye patch image data of the user;

determining a time difference between one or more of the following: a beginning of the first blink and a beginning of the second blink, an end time of the first blink and an end time of the second blink, and/or a first time during the first blink and a first time during the second blink;

determining a blink rate using the time difference; and
determining a probability of a blink during an image capture, based on the blink rate.

* * * * *